(12) United States Patent
Pero, III

(10) Patent No.: US 10,301,006 B2
(45) Date of Patent: May 28, 2019

(54) RIGID POLYMER MATERIAL SHEET FOR BUILDING CONSTRUCTION

(71) Applicant: Michael A. Pero, III, Wood Ridge, NJ (US)

(72) Inventor: Michael A. Pero, III, Wood Ridge, NJ (US)

(*) Notice: Subject to any disclaimer, the term of this patent is extended or adjusted under 35 U.S.C. 154(b) by 0 days.

(21) Appl. No.: 15/974,346

(22) Filed: May 8, 2018

(65) Prior Publication Data

US 2018/0257757 A1 Sep. 13, 2018

Related U.S. Application Data

(60) Continuation-in-part of application No. 15/606,690, filed on May 26, 2017, now Pat. No. 10,053,206.
(Continued)

(51) Int. Cl.
*B64C 1/40* (2006.01)
*E04C 2/20* (2006.01)
(Continued)

(52) U.S. Cl.
CPC ............ *B64C 1/40* (2013.01); *B29C 44/5618* (2013.01); *E04C 2/205* (2013.01); *B29C 44/02* (2013.01);
(Continued)

(58) Field of Classification Search
CPC ........... B64C 1/40; E04C 2/205; B29C 44/02; B29C 67/202; B29K 2105/0044;
(Continued)

(56) References Cited

U.S. PATENT DOCUMENTS 3,041,193 A * 6/1962 Edwards ................. B32B 27/00
156/154
3,432,449 A * 3/1969 Deal ....................... B32B 27/00
521/145
(Continued)

FOREIGN PATENT DOCUMENTS

| CN | 102604255 | | 7/2012 | |
| CN | 103265776 A | | 8/2013 | ............... B29B 7/74 |
| JP | 61276835 A | * | 12/1986 | |

OTHER PUBLICATIONS

Kosman, Evaluation of new antidiuretic agent, desmopressin acetate (DDAVP), Abstract (Year: 1978).*
(Continued)

*Primary Examiner* — Brent W Herring
(74) *Attorney, Agent, or Firm* — Ernest D. Buff & Associates, LLC; Ernest D. Buff; Margaret A. LaCroix

(57) ABSTRACT

An eco-wood formulation finds new uses as construction materials. A rigid polymer material sheet for use in building construction comprises a polymer mixture of ultrafine particles of polyvinylchloride (PVC) impact modifier, plant fiber, coupling agent, smoke suppressant, activated clay, lubricant, an activator, environmentally friendly flame retardant, heat stabilizers, odorless crosslinking agent, foaming agent, desmopressin agent. Alternatively, the rigid polymer material sheet is composed of: a polymer mixture of PVC, plasticizer, nitrile rubber, PCC, stearate, zinc oxide, retardant heat, heat stabilizers, crosslinking agent, vesicant; whereby said rigid polymer material sheet provides enhanced thermal resistance and sound attenuation properties for use in building construction, aviation and marine industries.

9 Claims, 10 Drawing Sheets

Related U.S. Application Data which is a division of application No. 15/065,601, filed on Mar. 9, 2016, now Pat. No. 9,694,897.

(60) Provisional application No. 62/174,462, filed on Jun. 11, 2015, provisional application No. 62/172,059, filed on Jun. 6, 2015, provisional application No. 62/177,656, filed on Mar. 20, 2015.

(51) Int. Cl.

| | | |
|---|---|---|
| *B29C 44/56* | (2006.01) | |
| *B29K 105/04* | (2006.01) | |
| *B29C 67/20* | (2006.01) | |
| *B29K 105/00* | (2006.01) | |
| *B29K 27/06* | (2006.01) | |
| *B29C 44/02* | (2006.01) | |
| *B29L 31/00* | (2006.01) | |
| *B29K 511/14* | (2006.01) | |
| *B29K 433/04* | (2006.01) | |
| *B29K 75/00* | (2006.01) | |
| *B29K 105/24* | (2006.01) | |
| *B29L 31/10* | (2006.01) | |
| *B29K 427/06* | (2006.01) | |
| *B29K 455/02* | (2006.01) | |

(52) U.S. Cl.
CPC ........ *B29C 67/202* (2013.01); *B29K 2027/06* (2013.01); *B29K 2075/00* (2013.01); *B29K 2105/0005* (2013.01); *B29K 2105/0026* (2013.01); *B29K 2105/0038* (2013.01); *B29K 2105/0044* (2013.01); *B29K 2105/041* (2013.01); *B29K 2105/046* (2013.01); *B29K 2105/24* (2013.01); *B29K 2105/251* (2013.01); *B29K 2427/06* (2013.01); *B29K 2433/12* (2013.01); *B29K 2455/02* (2013.01); *B29K 2511/14* (2013.01); *B29K 2995/0002* (2013.01); *B29K 2995/0015* (2013.01); *B29L 2031/005* (2013.01); *B29L 2031/10* (2013.01); *B29L 2031/722* (2013.01)

(58) Field of Classification Search
CPC ........ B29K 2105/0026; B29K 2027/06; B29K 2995/0015; B29K 2105/0038; B29K 2105/041; B29K 2105/046
See application file for complete search history.

(56) References Cited

U.S. PATENT DOCUMENTS

| | | | | |
|---|---|---|---|---|
| 3,698,993 | A * | 10/1972 | Rauh ................. | A23B 7/02 181/294 |
| 4,079,107 | A * | 3/1978 | Brunner ............... | C08J 9/06 264/50 |
| 4,284,681 | A | 8/1981 | Tidmarsh et al. ............ | 442/101 |
| 4,510,201 | A | 4/1985 | Takeuchi et al. ............ | 428/385 |
| 5,300,533 | A | 4/1994 | Dahl et al. .................. | 521/76 |
| 5,318,835 | A * | 6/1994 | Sawamoto ............ | C09J 7/0217 428/317.3 |
| 5,695,870 | A | 12/1997 | Kelch et al. .............. | 428/318.4 |
| 5,965,249 | A * | 10/1999 | Sutton ................. | C08J 9/40 248/562 |
| 6,254,956 | B1 | 7/2001 | Kjellqvist et al. ............. | 428/44 |
| 6,586,080 | B1 * | 7/2003 | Heifetz .............. | B29C 63/0017 428/198 |
| 6,838,147 | B2 * | 1/2005 | Burns, Jr. ........... | D06N 7/0086 428/313.3 |
| 8,097,658 | B2 | 1/2012 | Rosthauser ................... | 521/103 |
| 8,419,883 | B2 * | 4/2013 | Day .................... | B29C 44/1285 156/169 |
| 2001/0031350 | A1 * | 10/2001 | Day ..................... | B29C 70/086 428/317.9 |
| 2003/0157295 | A1 * | 8/2003 | Burns, Jr. ........... | D06N 7/0086 428/95 |
| 2005/0123744 | A1 * | 6/2005 | Mohanty ................ | B29C 67/24 428/331 |
| 2006/0063850 | A1 * | 3/2006 | Kanae ..................... | C08J 7/123 522/1 |
| 2006/0264523 | A1 | 11/2006 | Lee et al. ........................ | 521/99 |
| 2008/0299351 | A1 * | 12/2008 | Buchholtz ................ | B44F 9/02 428/151 |
| 2010/0266833 | A1 * | 10/2010 | Day .................... | B29C 44/1285 428/304.4 |
| 2011/0016545 | A1 * | 1/2011 | Gray ..................... | C12N 9/248 800/15 |
| 2011/0240064 | A1 * | 10/2011 | Wales ..................... | C09D 5/14 134/26 |
| 2012/0015176 | A1 * | 1/2012 | Riebel .................... | B32B 27/06 428/323 |
| 2012/0184166 | A1 * | 7/2012 | Kurihara ................ | D01F 6/625 442/181 |
| 2013/0273308 | A1 * | 10/2013 | Day .................... | B29C 44/1285 428/114 |
| 2013/0310471 | A1 | 11/2013 | Becker et al. ................... | 521/73 |
| 2016/0088941 | A1 * | 3/2016 | Snowbarger ........ | A47B 96/021 211/135 |
| 2016/0200034 | A1 * | 7/2016 | Quanshan ............ | B32B 27/304 428/141 |

OTHER PUBLICATIONS

'Vacuum Assisted Resin Transfer Molding of Foam Sandwich Composite Materials: Process Development and Model Verification' by Rebecca Ann McGrane for Virginia Polytechnic Institute. Found at: https://vtechworks.lib.vt.edu/bitstream/handle/10919/42108/McGrane2.pdf?sequence=1&isAllowed=y.

"Effect of additives on flexible PVC foam formation" in Journal of Materials Processing Technology 2007.04.123.

'Phthalates and their Altermatives; Health and Emvironmental Conerns' Technical Briefing; Lowell Center for Sustainable Production; table 2 on p. 8 found at: http://www.sustainableproduction.org/downloads/PhthalateAlternatives-January2011.pdf.

'1,2-Cyclohexane dicarboxylic acid diisononyl ester' from Wikipedia found at: https://en.wikipedia.org/wiki/1.2-Cyclohexane_dicarboxylic_acid_diisononyl_ester.

Diisononyl 1,2-cyclohexanedicarboxylate (DINCH) and diisononyl (ortho)phthalate (DINP) is a plasticizer that has chemical hazards as indicated in the U.S. Consumer Product Safety Commission at https://www.cpsc.gov/PageFiles/98260/dinp.pdf.

\* cited by examiner

Fig. 3.1 Relationship between the Fikentscher K value (DIN 53726-1983) and the molecular weight of PVC polymers.

1 mm

Photo No. 1

Photo No. 2

RIGID POLYMER MATERIAL SHEET FOR BUILDING CONSTRUCTION

This application is a Continuation-In-Part of U.S. patent application Ser. No. 15/606,690, filed May 26, 2017 which, in turn, is a divisional of U.S. patent application Ser. No. 15/065,601, filed Mar. 9, 2016, entitled "SYSTEM FOR MANUFACTURE OF FOAM SHEETS RIGIDIZED WITH POLYMER INFILTRATION", now U.S. Pat. No. 9,694,897 which, in turn, is a Nonprovisional Patent Application of Provisional Application No. 62/174,462 filed Jun. 11, 2015, entitled "SYSTEM FOR MANUFACTURE OF FOAM SHEETS RIGIDIZED WITH POLYMER INFILTRATION" which, in turn, claims the benefit of Provisional Application No. 62/172,059 filed Jun. 6, 2015, entitled "SYSTEM FOR MANUFACTURE OF FOAM SHEETS RIGIDIZED WITH POLYMER INFILTRATION" which, in turn, claims the benefit of Provisional Application No. 62/177,656 filed Mar. 20, 2015 entitled "SYSTEM FOR MANUFACTURE OF FOAM SHEETS RIGIDIZED WITH POLYMER INFILTRATION", the disclosures of which are hereby incorporated in their entireties by reference thereto.

FIELD OF THE INVENTION

The present invention relates to manufacture of rigid foam industrial sheets with applications not limited to building materials, such as wallboard, tile, lumber, a wide variety of wood and wood related products, insulation sheets and the like; and, more particularly to a system which forms plain or decorative low or high density high strength high modulus flexed or rigid sheets by a high-temperature high-pressure molding process forming polyvinyl chloride polymer foams that incorporate polymer additives.

DESCRIPTION OF THE PRIOR ART

Decoration boards presently available in the market include, for example, wooden board, particleboard, oriented strand board ("OSB board"), plywood, density board, fiber composite board, PVC foaming board, and fireproof board. Wooden board, OSB board, particleboard, density board, and fiber composite board exhibit very low insulation properties and low anti-flaming and fire resistant performance. They are not waterproof or moisture proof and, consequently, enjoy somewhat limited application. Fireproof board is generally a sandwich board with 3 layers. Metal boards (aluminum boards, stainless steel boards, colored iron boards, titanium zinc boards, titanium boards, copper boards, etc.) comprise a metallic surface and bottom layers, and halogen-free, anti-flaming inorganic compositions comprising the middle layer. This hot-pressed composite board exhibits good anti-flaming and fire resistant performance, but it is heavy, expensive, and is not waterproof.

Numerous prior art patents and disclosures relate to formation of sheet material from polymeric foam. Specifically, these polymeric foams are not infiltrated with polymers to produce plain or decorative rigid sheets for use in structural or decorative building materials and other applications, such as wall, floor and ceiling insulation systems and aviation, thermal acoustic insulation systems.

U.S. Pat. No. 4,284,681 to Tidmarsh, et al. discloses composite sheet material. The composite material comprises a layer of highly-plasticized polyvinylchloride, comprising 15 to 45% of polyvinylchloride and 55 to 85% by weight of a plasticizer, a fibrous backing, and an intermediate layer of a polymeric material between the polyvinylchloride layer and the backing.

Various adhesives may be used to stick the composite material to substrates such as walls, ceilings, and floors. If the intermediate layer is not completely impervious to the plasticizer in the highly-plasticized layer, then the adhesive should preferably resist plasticizer migration. This composite material is a coating layer on a structural object, but is by itself not a structural material.

U.S. Pat. No. 4,510,201 to Takeuchi, et al. discloses a polyvinyl chloride resinous molded sheet product. The polyvinyl chloride resinous compositions containing cellular fillers such as Silus Balloon and pearlite and molded products are prepared by subjecting the compositions to heating at an increased pressure. The molded products may be combined with a core layer such as a non-woven fabric and a victria lawn, a foamed layer such as PVC paste resinous foam, and a surface layer such as a non-foamed synthetic resin, and molded into laminated sheet products. Those are made lighter and superior in soundproof and adiabatic effects, bending strength, dry toughness, water resistance, dimensional stability, cold resistance and the like. The sheet product is usable as floor coverings and other applications. This is a multilayer PVC molded sheet and is not a low-density single layer PVC foam.

U.S. Pat. No. 5,300,533 to Dahl, et al. discloses a method for production of crosslinked plastic foam. This method produces foamed cross-linked vinyl chloride containing polymer wherein a blowing agent is added to a copolymer produced by a copolymerization of a monomer composition comprising vinyl chloride and glycidyl containing monomer. Foaming of the copolymer occurs by the decomposition products of the blowing agent or decomposition products of reaction from a chemically reactive azodicarbonamide blowing agent with epoxy groups of the copolymer. The glycidyl containing monomer is a glycidyl acrylate or methacrylate or butylacrylate. It is possible to crosslink foamed vinyl chloride polymers through an addition of epoxy groups which are introduced via a copolymer. The crosslinking takes place by help of the decomposition products from the blowing agent. This requires formation of copolymer of vinyl chloride and glycidyl methacrylate to be produced by suspension-, microsuspension-, emulsion- or mass polymerization.

U.S. Pat. No. 5,695,870 to Kelch et al. discloses laminated foam insulation board of enhanced strength. This laminated insulating foam board comprises a panel composed of a plastic foam material thickness of about ¼ inch to about 1 inch; and first and second thermoplastic facer films, each adhered to primary, opposite surfaces of the panel, the facer films being biaxially oriented, the facer films each having a thickness of about 0.35 to about 10.0 mils. The board produced has an ultimate elongation of less than 200 percent in both machine and transverse directions and a yield tensile strength of at least 7,000 pounds per square inch in both machine and transverse directions with a 1 percent secant modulus of at least 200,000 pounds per square inch in both machine and transverse directions. The laminated foam insulation is a panel of extruded polystyrene plastic foam material and is not a polyvinylchloride foam.

U.S. Pat. No. 6,254,956 to Kjellqvist et al. discloses a floor, wall or ceiling covering. This floor, wall or ceiling covering comprises one or more substantially random interpolymers prepared by polymerizing one or more α-olefin monomers with one or more vinylidene aromatic monomers and/or one or more hindered aliphatic or cycloaliphatic vinylidene monomers, and optionally with other polymerizable ethylenically unsaturated monomer(s). The floor, wall or ceiling covering has a good balance of properties, such as sufficient flexibility and conformability to uneven or contoured surfaces for efficient application to floors, walls, or ceilings, sufficient scratch resistance, sufficient indentation resistance, indentation recovery and/or sufficient abrasion resistance. The floor, wall or ceiling covering is made by polymerizing one or more polymers. The floor wall or ceiling covering is not a polyvinylchloride foam product made by hot pressing a slurry composition.

U.S. Pat. No. 8,097,658 to Rosthauser discloses a process for the production of medium density decorative molded foams having good fire retardant properties with reduced mold times, fire retardant compositions and foams produced by this process. This fire-resistant, medium density molded polyurethane foam is said to be removed from a mold in substantially shorter times than previously possible. These reduced de-mold times are achieved by including a solid flame retardant composition in the polyurethane foam forming composition. This solid flame retardant composition includes a melamine coated ammonium polyphosphate and zinc borate. The process uses polyurethane foam forming a reactive mixture and is not indicated to be a low-density polyvinylchloride foamed structural material.

U.S. Patent Application No. 20060264523 discloses polyvinyl chloride foams. The polyvinyl chloride foams exhibit improved mechanical strength and non-flammability. Microcellular polyvinyl chloride foams having the closed cell structure have a high foaming efficiency even with a small amount of a foaming agent. The polyvinyl chloride foams comprise vinyl chloride resin-layered silicate nanocomposites in which the layered silicates are dispersed onto the vinyl chloride resins containing foaming agents. The foaming of the composition is accomplished by mechanical action of carbon dioxide injection and the specific gravity of foam formed is very high, greater to 1 gram/cc.

U.S. Patent application No. 20130310471 discloses the use of di (isononyl) cyclohexanoate (DINCH) in expandable PVC formulations. The invention relates to a foamable composition containing at least one polymer selected from the group consisting of polyvinyl chloride, polyvinylidene chloride, polyvinyl butyrate, polyalkyl (meth) acrylate and copolymers thereof. The plasticizer used is diisononyl 1,2-cyclohexanedicarboxylate (DINCH) and diisononyl (ortho) phthalate (DINP) is a plasticizer that has chemical hazards as indicated in the U.S. Consumer Product Safety Commission at https://www.cpsc.gov/PageFiles/98260/dinp.pdf. The foam former of azodicarbonamide. Foam stabilizer is ZnO which acts as a kicker for the decomposition of azodicarbonamide. The polymeric composition is formed a low viscosity plastisol and has to be applied to a support during over curing. Accordingly, the '471 application does not produce free-standing low-density PVC sheets.

Chinese patent application # CN103265776A to Hou Yu Hung Yi-Drain discloses an eco-wood and its preparation method. The ecological wood provides a waterproof, moisture resistant material that does not contain formaldehyde, toluene and other harmful substances. The eco-wood is flame-retardant with small amount of smoke and has ductility, toughness, good impact resistance and acid corrosion resistance. The preparation method for the long life ecological wood comprises the following components by weight: Chlorine vinegar copolymer resin: 60 to 70, Impact modifiers (Nitrile butadiene rubber): 9-11, Plant fiber: 20 to 30, Coupling agent (titanate): 1 to 3, Smoke suppressant: 10-20, Activated Clay: 5-15, Lubricants (polyethylene wax): from 0.5 to 1.5, Activator (ZnO): 4-6, Green flame retardant (ammonium phosphate): 8-10, Thermal Stabilizer (Ca and Zn compounds): 4-8, Odorless crosslinking agent: 0.5 to 1.5, Foaming agent (AC-3000 which is azodicarbonamide): 1 to 5, Desmopressin agent: 1 to 5.

The preparation method includes plant fiber pretreatment, kneading mixer, open mill soak, the film machine the film, closed-cell foam mold, cooling stable pattern. The composition of the eco-wood comprises wood fibers and relies for toughness the polyvinylchloride resin which contains polyvinyl acetate used to make ecological wood product. The composition is directed to a method of preparing ecological wood products directed to furniture, interior decoration and other decorative plates, it does not teach or disclose use for construction of building structures, wall systems, and/or for aeronautics.

Chinese patent application # CN102604255 to Hou Yu Hung Yi-Ji Yong discloses a decorative plate and preparation method, decorative panels mainly resins, plasticizers, nitrile rubber, calcium carbonate, stearic acid, zinc oxide, and flame produced from the chlorine vinegar copolymer. It is a foam sheet, lighter, and without the use of a metal plate as a panel, low cost; and the invention of decorative plates, chlorine vinegar copolymer resin used in flame retardant effect, copolymer resins and hindered by chlorine vinegar with, fire-retardant and fire-resistant properties of the availability of the preferred flame retardant, so that the decorative panel to fire rating requirements. Further, the present invention uses a flame retardant chemical production in Jiangsu Jacques CA117 fire retardant, the test, the present invention is decorative plates, flame spread index of 25, smoke development index of 135, reaching the Class A ASTM E84 fire rating, and combustion does not produce hydrogen halide under harsh environmental conditions, in line with the national standard fire rating, and environmental requirements. The composition is directed to a method of preparing ecological wood products directed to furniture, interior decoration and other decorative panels, it does not teach or disclose use for construction of building structures, wall systems, and/or for aeronautics.

The web page at https://vtechworks.lib.vt.edu/bitstream/handle/10919/42108/McGrane2.pdf?sequence=1 &isAllowed=y discloses Vacuum Assisted Resin Transfer Molding of Foam Sandwich Composite Materials. This method relates to resin transfer molding of dry carbon preforms with polymethacrylimide foam cores to produce composite sandwich structures. This disclosure does not produce a polymer sheet hot pressed to produce a rigid plain or decorative structural sheet.

The publication "Effect of additives on flexible PVC foam formation" in Journal of Materials Processing Technology 2007.04.123 discusses the effects of Ca/Zn stearate and organotin heat stabilizers and zeolite, CaCO3, cellulose and luffa flours fillers, and their concentrations (2.5, 5, 10 and 20% by weight) on production of flexible PVC foams by chemical blowing agent. Azodicarbonamide was investigated. The stabilizer decreases the decomposition temperature of azodicarbonamide from 200° C. to PVC processing temperature of 160 to 190 https://en.wikipedia.org/wiki/1,2-Cyclohexane_dicarboxylic_acid_diisononyl_ester 1,2-Cyclohexane dicarboxylic acid diisononyl ester is a plasticizer for the manufacture of flexible plastic articles in sensitive application areas such as toys, medical devices and food packaging. From a chemical point of view it belongs to the group of aliphatic esters. In 2002, BASF started selling 1,2-cyclohexane dicarboxylic acid diisononyl ester under the tradename of Hexamoll DINCH as an alternative for phthalate plasticizers. [3]

http://www.sustainableproduction.org/downloads/PhthalateAlternatives-January2011.pdf Table 2 Alternative Plasticizers

| Alternative | Function/Product | Human Health Concerns | Environmental Concerns |
| --- | --- | --- | --- |
| ATBC: Acetyl tributyl citrate | Primarily used as a plasticizer in cosmetic products, toys, vinyl, adhesives, medical devices, pharmaceutical tablet coatings, food packaging, flavoring substance in foods, printing inks and plastics in concrete. Also used as a surface lubricant in the manufacture of metallic articles that contact food [14, 15, 17, 19, 21]. | Intravenous exposure affects the central nervous system and blood in laboratory animals. May have moderate irritation effects on eyes and increase liver weights [21]. Studies show that it inhibits the proliferation of Lymph node T cells [16]. Exhibits fire and explosive hazard in the presence of strong oxidizers and nitrates [14]. | Can bioaccumulate and is inherently biodegradable (in an inherent biodegradation test, 80 percent was degraded). However, in a nonstandard test aerobic degradation was slow and no data is available on anaerobic degradation [21]. |
| DINCH: Di-isononylcyclohexane-1,2-dicarboxylate | Primarily used as a plasticizer in PVC medical devices (blood tubes or packaging for nutrient solutions), toys, food packaging, cosmetics products, shoes, exercise mats and cushions, textile coatings, printing inks [17]. | Acute toxicity effect is low, However, an increase in testes weight, liver weight, thyroid weight, serum gammaglutamyl transferase and thyroid-stimulating hormone was observed in laboratory animals after repeated exposure. Blood and transitional epithelium cells in urine was also observed [22, 40]. | No data found regarding effects of environmental exposures. |
| DOTP: Dioctyl Terephthalate | Primarily used as a plasticizer for PVC toys, childcare articles, consumer products, beverage closures and other polymer materials including cellulose acetate-butyrate, cellulose nitrate, and chloroprene rubbers [32, 40]. | Slightly irritating to eyes but will not damage eyes. Prolonged exposure may cause dermatitis. Studies involving rodents showed inflammatory damage to the kidneys [23]. | Potential for bioconcentration in aquatic organisms is low. Likely to be biodegradable under aerobic and anaerobic conditions [32]. |
| ESBO: Epoxidized soybean oil | Primarily used as a plasticizer in closure gaskets used to seal glass jars, and as a stabilizer to minimize the ultraviolet degradation of PVC resins baby food jars, fillers, paint and lacquers, adhesives, printing inks, and packaging [18, 21]. | A worker developed asthma from exposure to vapors from heated PVC film. Vapor may also produce asthmatic symptoms in as little as 5 minutes [21]. Studies involving rats have reported skin and eye irritations, secondary agent in bronchospastic reaction. Suspected to cause some effects on the kidney, liver, testis and uterus by repeated oral administration [18]. | Toxic to the crustacean Daphnia magna. Estimated to be bioaccumulative. Two standard tests administered by OECD concluded it is biodegradable in aerobic environments [21]. |

-continued

| Alternative | Function/Product | Human Health Concerns | Environmental Concerns |
| --- | --- | --- | --- |
| Mesamoll II: alkylsulphonic phenyl ester (ASE) | Used as a plasticizer in PVC, polyurethanes, natural rubber, styrene-butadiene rubber, blends of styrenebutadiene rubber and butadiene rubber, isobutyleneisoprene rubber, acrylonitrilebutadiene rubber, and chloroprene rubber [24]. | Has not been comprehensively studied for toxic effects. | No data found regarding effects of environmental exposures. |
| TETM: Tri-2-ethylhexyl trimellitate | Primarily used for heatresistant PVC articles, PVC-products used in the hospital sector (blood platelet bags), packing, cables, profiles, and floor/wall coverings [21] | May cause irritation, nausea and vomiting in humans from exposure to mists and fumes. Toxic to laboratory animals through inhalation, Shown to irritate the skin of guinea pigs, rabbits and mice and the eyes of rabbits. Studies in dogs showed an increase in weight of liver and spleen. In rats, exposure through diet resulted in slightly increased liver weights and peroxisome proliferation [21]. | Very limited data on environmental effects is available. Potential for environmental effects is associated with the accumulation of the compound in biota, in aquatic sediments and in soils treated with sewage sludge. Available data indicate that it does not biodegrade readily [21]. |
| COMGHA: Acetylated monoglycerides of fully hydrogenated castor oil | Used in PVC-containing films, tubes, bottles, food packaging materials and other polymers such as polyolefin, styrene, and PET [40]. | No data found describing human exposure. Slightly lower migration rate was found when compared to DEHP [40]. | No data found regarding potential environmental effects. |
| Eastman 168: bis(2-ethylhjexyl)-1,4-benzenedicarboxylate | Used as a plasticizer in PVC toys, bottle caps and closures, coatings for cloth, electric connectors, flexible film, pavement, striping compounds, walk-off mats, sheet vinyl flooring, other vinyl products, and PVC/VA copolymer resins. [39]. | No data found. | No data found regarding potential environmental effects. |
| DEHA: Di(2-ethyl hexyl) Adipate | Used as a plasticizer in toys, vinyl flooring, wire and cable, stationery, wood veneer, coated fabrics, gloves, tubing, artificial leather, shoes, sealants, and carpet backing. Also used in films employed | Slightly toxic when administered intravenously in animal studies. May produce dose-dependent changes in the body. Reported to cause liver tumors, reduced bodyweight and increased liver weight (may | Toxic to algae, crustaceans and fish. Chronic data on crustaceans show adverse effects on reproduction of Daphnia magna. Not a bioaccumulative substance. Available data indicate |

-continued

| Alternative | Function/Product | Human Health Concerns | Environmental Concerns |
|---|---|---|---|
| | in food packaging materials, fillers, paint and lacquers, adhesives, plastic in concrete, and rubber products. Expected to be widely used in the near future in products for the hospital sector, printing inks and other PVC products [21, 40]. | be a result of hepatic peroxisome proliferation) in mice and rats [21, 40]. | evidence of biodegradability [21]. |
| DBA: Di-butyl adipate | Primarily used as a plasticizer for resins. Also used in floor wax [53]. | Combustible. Mildly irritating to skin and causes coughing when inhaled [54]. No data found on long-term exposure effects. | Moderately toxic to fish, daphnids and algae. Readily biodegradable. No data found on bioaccumulation [53]. |
| BHT: Butylated Hydroxytoluene | Used in childcare articles intended to be mouthed such as teething products and as an antioxidant in EVA and polyethylene plastics. Also used as a food additive [19]. | May cause impaired blood clotting, hemorrhage, cytotoxicity, hepatocellular injury and carcinogenesis [19]. | No data found regarding potential environmental effects. |
| HPCL: Hyperbranched poly (ϵ-caprolactone) | Intended primary use is in PVC applications including coating resins, polymer additive, adhesive agents, and processing aids [41]. | No data found. According to one study, it does not migrate when used in PVC even under harsh conditions such as high temperature [41]. | No data found regarding potential environmental effects. |
| DEHPA: Di(2-ethylhexyl) phosphate | Primarily used as a flame retardant in products with specific fire resistant demands. Also used as a plasticizer in PVC products used in the hospital sector, packaging, cables, floor and wall coverings [21]. | In humans, inhalation caused weakness, irritability and headache. Causes irritation of the eyes, and first and second degree skin burns. Reported to be corrosive to the skin and eyes in rabbits [21]. | Ecosystem toxicity data indicate it is harmful to algae, crustaceans and fish. In a test involving the microorganism thiobacillus ferrooxidans, respiration was inhibited. Has low bioaccumulation potential and is inherently biodegradable [21]. |
| TEHPA: Tri(2-ethylhexyl) Phosphate | Used in fillers, paint and lacquers, adhesives, plastic in concrete and similar DEHPA applications [21]. | May produce moderate erythema and slight irritation to eyes. Observed effects in rats include hematological changes and reduced body weight gain. A slight evidence of carcinogenicity has been observed in female mice [21]. | Data show it is toxic to algae. Not readily biodegradable according to the available aerobic biodegradation data. Slowly biodegrades under anaerobic conditions when present in weak solutions [21]. |
| OTSA: O-toluene sulfonamide | Information on use is limited. Anticipated to be used in the future | Reported to be teratogenic in rats, but only exhibiting a weak mutagenic effect | Does not readily biodegrade [21]. |

-continued

| Alternative | Function/Product | Human Health Concerns | Environmental Concerns |
|---|---|---|---|
| | mainly in PVC cables [21]. | (this is however based on studies without detailed descriptions of the study design) [21]. Sulfonamides may cause hyperbilirubinemia in infants. In addition, sulfonamides may cause hemolytic anemia in glucose-6-phosphate dehydrogenase-deficient neonates [37]. | |
| TXIB: 2,2,4-trimethyl 1,3-pentanediol diisobutyrate | Primarily used as a plasticizer in PVC toys, flooring, products used in the hospital sector. Also used in fillers, wallpaper, paint and lacquers, printing inks, plastic in concrete, artificial leather, packaging, as well as vinyl and urethanes [21, 47, 48]. | May be associated with eye irritation and nasal allergies [47]. Has been observed to be slightly irritating in guinea pigs. Reversible liver weight changes have also been observed in rats from chronic exposure [21]. | Has some potential for bioaccumulation [21]. |
| DOS: Dioctyl Sebacate | Primarily used as a plasticizer for PVC products and elastomers. Compatible with nitrocellulose and polyvinylidene chloride. Anticipated to be used in printing ink and adhesives [21, 38]. | Exhibits moderate acute toxicity when administered orally to rats. Oral administration to rats also showed increased liver weight, peroxisome proliferation and increased levels of peroxisome enzymes [21]. | Has a high bioaccumulation potential and has been shown to degrade slowly [21, 38]. |
| DBS: Di-butyl sebacate | Used as a plasticizer, flavoring agent, and cosmetic and perfume additive [56]. | Combustible. Chronic skin contact may cause skin sensitization [55]. Mildly toxic when ingested [56]. | Biodegradable. Low and moderate potential for bioaccumulation and bioconcentration in aquatic organisms respectively [56]. |
| Grindsted soft-n-safe: Made from fully hydrogenated castor oil and acetic acid | Primarily used as a plasticizer in food contact materials (approved for use in the EU, US, South America and most of Asia), medical devices, vinyl flooring, wallpaper, shrink wrap film, textile dyes, ink applications, adhesives and sealants [26, 27]. | According to the manufacturer (Danisco), it shows no indication of dermal absorption/ irritation or eye irritation. No hormone-disrupting or mutagenic effects may result [27]. | According to the manufacturer, there is no indication of aquatic toxicity [27]. Biodegradable [26]. |

Based on the foregoing, there exists a need in the art for an easy to use method for manufacturing building materials in the form of plain or decorative rigid structural sheets that exhibit flame resistance, enhanced insulation and mold-free properties.

SUMMARY OF THE INVENTION

It has been found that using eco-wood formulations that were only previously known and used only for furniture and interior decorative plates/panels, can be made and used for building construction. Surprisingly and unexpectedly, it has been found that eco-wood formulations believed only suitable for furniture, interior decoration and other decorative panels are suitable for use as actual building construction materials used in wall, floor and ceiling assemblies. On information and belief, compaction of the formulations results in a sheet material with closed air cells that impart the sheet with thermal resistance and sound attenuation properties, so that the sheets may be used in building construction as well as aeronautic insulation systems. Additionally, it has also been found that the material is imparted with increased strength, bend capability, improved thermal insulation properties and improved acoustic insulation over current building construction materials.

The present invention utilizes a rigid polyvinylchloride based foam sheet with fibers previously only used for interior furniture/decorative paneling for, but not limited to, building construction. The sheets have a density ranging from 0.12 to 0.66 grams/cc, which is about 10% to 40% of solid flexible PVC (which typically exhibits a density of 1.1 to 1.35 grams/cc). Sheets used according to subject invention have a very large number of closed microcells ranging in dimension from 10 to 70 micro meters. The cells have a cell wall of polyvinylchloride based polymer. These sheets have been found to have extremely small sized uniformly distributed closed cells of air pockets that enhance thermal insulation properties and provide sound attenuation characteristics when used in actual building construction. It has been found that the density of the sheets produced depends on the composition of the PVC resin, mold fill quantity, and the pressure and temperature applied during sheet formation.

In a first embodiment, a rigid polymer material sheet for use in building construction is provided. The rigid polymer material sheet is composed of: a polymer mixture of ultra-fine particles of polyvinylchloride (PVC) impact modifier, plant fiber, coupling agent, smoke suppressant, activated clay, lubricant, an activator, environmentally friendly flame retardant, heat stabilizers, odorless crosslinking agent, foaming agent, desmopressin agent. The rigid polymer material sheet has been found to provide enhanced thermal resistance and sound attenuation properties for use in building construction, aviation or other industries. Preferably, the rigid polymer material sheet has the following weight percent ranges: PVC: 55-85, impact modifier: 4-15, plant fiber: 10-40, coupling agent: 0.5-5, smoke suppressant: 5-25, activated clay: 2-25, lubricant: 0.3-5, the activator: 2-10, environmentally friendly flame retardant: 5-15, heat stabilizers: 2-12, odorless crosslinking agent: 0.2-2.5, the foaming agent: 0.5-7, desmopressin agent: from 0.5-8. It has been found that the rigid polymer material sheet is suitable for use for at least one member of a group consisting of: a wall board, wall systems, and sheathing board, due to its increased thermal insulation properties and bend properties. It has also been found that the rigid polymer material sheet is suitable for use for at least one member of a group consisting of: lumber and framing structures and in wall, floor and ceiling assembly systems and sheathing board due to its increased thermal insulation properties, low water absorption, fire resistance and load bearing or bend properties. The rigid polymer material sheet has also been found to be suitable for use as a flooring material due to its increased thermal insulation properties, as well as siding or embossed interior or exterior insulation sheets. It has further been found that the sheet is suitable for forming wall or building board due a finding that it poses increased strength, rigidity or bend capability and thermal insulation properties. The rigid polymer material sheet has also been found suitable for use for at least one member of a group consisting of: door and window and door framing due to its increased strength, rigidity or bend capability, paintability, fire resistance, and thermal insulation properties. What is more, it has been found that the rigid polymer material sheet can be used in aeronautic acoustic thermal insulation systems.

The plant fiber is pretreated in preparing the material. The plant fiber is pretreated by baking to reduce the plant fiber moisture content to 2.5% or less and it is then fed into a high-speed mixer. Coupling agent, 1-3 parts by weight, is added and the mixture stirred for 5-20 minutes. Next, the mixture is kneaded and PVC, 60-70 parts by weight, is added along with the impact modifier (9-11 parts by weight), smoke suppressant (10-20 parts by weight), from 5-15 parts by weight of clay (preferably attapulgite), lubricants (0.5-1.5) parts by weight, activator (4-6 parts by weight), environmentally friendly flame retardant (8-10 parts by weight), heat stabilizer (4-8 parts by weight), desmopressin agent (1-5 parts by weight). The mixture is kneaded at 60~80N of pressure for about 10-15 min with sweep 2 to 3 times. During the kneading process after heating, the mixer temperature rises to within a range of 140~142° C., then odorless and/or tasteless cross-linking agent (0.5-1.5 parts by weight) is added along with 1-5 parts by weight of a blowing agent. The mixture is then kneaded 2~3 min, the material, resulting rubber compound. Open mill soak is carried out, mix into the open mill thick run through twice, followed by thin through twice, cross stacker, with temperature controlled at 125~130° C. The mixture is then fed into a machine the film, the temperature of the machine's control in 105~110° C., prepared film. Next, the compound is fed into a vulcanizing mold foaming machine, curing temperature control 165~170° C., foaming time is 30~35 min, foaming dealt with relief, that was a foam. Lastly, the material is compacted, with temperature below 20° C., the cooling plate applied 15~20 min after compaction to form the rigid polymeric sheet, trimmed, cut or molded for the building construct. After the addition of a heat stabilizer 1 to 2 parts by weight of a dispersant, 0.5 to 1.5 parts by weight of an antioxidant, 0.5 to 1.0 parts by weight of an ultraviolet absorber may be added, followed by kneading with the above-described processing of other substances.

In another embodiment, a rigid polymer material sheet for use in building construction is provided composed of: a polymer mixture of polyvinylchloride (PVC), plasticizer, nitrile rubber, PCC, stearate, zinc oxide, retardant heat, heat stabilizers, crosslinking agent, vesicant; whereby said rigid polymer material sheet provides enhanced thermal resistance and sound attenuation properties for use in building construction, aviation or other industries, and decorative applications. Preferably, the rigid polymer material sheet has the following weight percent ranges: PVC: 45-135, plasticizer: 2-15, nitrile rubber: 5-30; PCC 2-25, Stearate 0.5-3.5, Zinc Oxide: 2-10, Retardant Heat 5-15, Heat Stablizers 2-15, Crosslinking Agent 0.2-2.5, Vesicant 2.5-7. It has been found that the rigid polymer material sheet is suitable for use for at least one member of a group consisting of: a wall board, wall, floor or ceiling systems, and sheathing board, due to its increased thermal insulation properties and rigidity or bend properties. It has also been found that the rigid polymer material sheet is suitable for use for at least one member of a group consisting of: lumber and framing structures and in wall, floor or ceiling assembly systems due to its increased thermal insulation properties and rigidity or bend properties. The rigid polymer material sheet has also been found to be suitable for use as a flooring material due to its increased thermal insulation properties, as well as siding and embossed exterior/interior insulation sheets. It has further been found that the sheet is suitable for forming building board due a finding that it poses increased strength, bend capability and thermal insulation properties. The rigid polymer material sheet has also been found suitable for use for at least one member of a group consisting of: door and window and door framing due to its increased strength and rigidity or bend capability, paintability and thermal insulation properties. What is more, it has been found that the rigid polymer material sheet can be used in aeronautic acoustic thermal insulation systems.

In this embodiment, the composition if prepared through the following steps: (1) kneading: 45-135 parts by weight of the PVC resin, 5-30 parts by weight of nitrile rubber (NBR), 2-15 parts by weight of a plasticizer, 2-20 parts by weight of light calcium carbonate, the mixture was mixed 3.5 parts by weight of stearic acid, 2-10 parts by weight of zinc oxide, 5-15 parts by weight of a flame retardant, 2-15 parts by weight of a heat stabilizer into the mixer, and pressurized to 75 liters 7-8 KG kneading 10-12 min; 140-150° C. discharge, obtain compound; (2) Thermal refining: Step (1) mixing the resulting compound into 18-inch mill refining heat hit triangle bag; three times thinner package, and then put into 18-inch mill heat refining play triangle bag, then resort to the secondary thick packet, mixing machine temperature control 145-150° C.; (3) a film: the after step (2) soak and then put into the plastic material 20-inch mill, a refining machine temperature control 145-150° C., film thickness of 2-5 mm the film, the film is cut into strips, cooling cooled to obtain a green sheet of plastic; (4) vulcanizing mold: will be closed-cell foam vulcanization, sulfur within the step (3) the resulting sheet into the embryo glue curing machine at 1500 tons of pressure, curing time of 25 to 45 minutes, curing temperature 160±5° C., obtain foam to be stable foam form, cooled to obtain a decorative plate products.

The method of production of polyvinylchloride based sheets uses ultrafine particles of virgin polyvinyl chloride synthesized by suspension-, microsuspension-, emulsion- or mass polymerization. These PVC particles in stage I are about 4 manometers, agglomerate in stage II to micro granules of 1-2 micrometers and a number of micro granules agglomerate in stage III to a particles ranging typically in size from 100 to 150 micrometers. These ultrafine homopolymer of polyvinylchloride and copolymers of polyvinylchloride with polyvinyl acetate are free flowing and they become raw materials for making the slurry for forming the sheets according to the subject invention. The K value of the PVC polymer used has a value greater than 65 representing a molecular weight greater than 60,000. The amount of polyvinyl acetate present in the copolymer has a strong influence on increasing the flexibility of the final product produced since polyvinyl acetate decreases the hardness, strength and modulus of the final sheet product and is maintained in the range of 2% to 30% of the copolymer.

Finely-ground cellulose or fibers are preferably mixed with the PVC particles to form a slurry. Preferably, the cellulose or fibers are wood fibers. Formation of a foamed product requires a foaming agent that produces fine pores with the mold PVC based sheet. The foaming agent decomposes at a decomposition temperature producing a large volume of gaseous reaction product. A number of foaming agents for use in foamed PVC production are known and they include for example azodicarbonamide, dinitrosopentamethylenetetramine, p-toluenesulfonyl hydrazide, and 4,4'-oxybis(benzene sulfonyl hydrozide. The preferred foaming agent is azodicarbonamide since it has a decomposition temperature of about 215 to 219° C. This decomposition temperature is slightly greater than the softening temperature of PVC compositions, which is typically in the range of 170 to 190° C. A kicker compound such as ZnO may be used to bring the decomposition temperature of azodicarbonamide to the softening temperature range of PVC resins used.

The PVC particles in the 100 to 150 micrometer range incorporate all the additives, including cellulous fibers, optional plasticizers, foaming modifiers and foaming agents, and are wetted by water assisted by anionic surfactants or by isopropyl alcohol forming slurry. This slurry is loaded into a mold and heated when it is under pressure between two plates. The drying of the slurry brings the PVC composition particles in close contact with each other due to surface tension and they join together when the softening point of the PVC and at the same time, the foaming agent decomposes and release a large amount of gas creating s low density PVC foam. The distribution of porosity in the molded PVC sheet is controlled by the particle size of the foaming agent and its distribution in the slurry.

The air cells formed have to be stabilized so that they remain until the polyvinylchloride polymer sets. The stabiles are typically organic or inorganic compounds such as barium/zinc, calcium/zinc or organ tin stabilizers Applications of the present invention also contemplate use in aeronautical technologies, including noise cancelling aviation insulating systems. These systems comprise an insulation sheet material, while also uniquely providing enhanced acoustic properties minimize the cabin sound from the exterior of an aircraft. Owing to its physical properties, the subject material is ideal for use as an aircraft thermal/acoustic insulation material. Both thermal and acoustical insulation is required on passenger aircrafts. Historically both functions have been provided by the same material system, which has mostly been fiberglass batting encapsulated in a plastic pillowcase covering. Covering plastics have been predominantly PET (such as polyethylene terephthalate, commonly sold under the trade name Mylar by DuPont), and a lesser quantity of polyvinyl fluoride (PVF), (commonly sold under the trade name Tedlar by DuPont), and a polyimide film (commonly sold under the trade name Kapton by DuPont) has been used. Use of the material of the subject invention provides the ability to replace at least some (if not all) of the material currently used with a curved acoustic-thermal aviation cocoon thereby increasing the thermal properties, while also improving the acoustics within the airplane cabin. What is more, use of the subject material results in cost savings as well as a slight decrease in weight, without being bound by theory, which in turn decreases fuel costs.

Typically, the thermal environment outside an airplane produces fuselage skin temperatures from about −60F when in-flight at altitude to about +160F when parked in direct sunlight in the desert. The amount of insulation needed for the air conditioning/heating system to economically produce comfortable cabin temperatures varies with airplane type and location. However, except for a few places such as the crown area over the aft passenger cabin and the lower fuselage area below the passenger floor, acoustic requirements predominate. Therefore, except for those places, the amount of insulation present exceeds that needed for thermal requirements.

Regarding acoustics, the outside noise is generated by aerodynamics and engines. Insulation is used to attenuate outside noise to allow reasonable levels of comfort and verbal communication inside the passenger cabin and flight deck. The acoustic attenuation needed varies from airplane to airplane, but is generally substantial and insulating material of very high acoustic efficiency is used to minimize the amount (weight, volume) required. Fiberglass batting, using a very small fiber diameter, is a highly efficient acoustic attenuator.

Currently, insulation using fiberglass batting will resist fire penetration in lower-intensity thermal environments. Cargo compartments are required to have liners that are fire barriers. In some compartments, the thermal insulation lining the fuselage provides the fire barrier. For these areas, the requirement involves a Bunsen burner test fiberglass batting easily passes. The FAA has released information in press reports that it plans to propose a requirement that insulation be resistant to burn through in an intense thermal environment like that of a fuel-fed fire. All insulation material systems would have to be redesigned to meet this requirement.

Accordingly, the subject invention provides improved building construction materials with a new use of previous eco-wood furniture formulations. Surprisingly and unexpectedly, the material provides improved acoustical, thermal, and fire barrier functions over current building construction materials, while providing cost savings. As pointed out hereinabove, implementation of the material of the subject invention provides the ability to replace at least some (if not all) of the fiber glass material currently used with a curved aviation insulation cocoon near the interior of the cabin. This increases the thermal properties, while also improving the acoustics within the air plane cabin and improving fire retardation. Such improved acoustics create an acoustic cocoon having noise deflection attributes. Any new insulation materials system must not substantially exceed the weight of existing systems, which averages about 0.1 lb/sqft. Glass batting varies from 0.34 to about 1.5 lb/cuft, with lighter weights predominating. Batting thickness is about 5 inches in the crown area, 3 inches along the sides, and 1 inch below the passenger floor. Covering material varies from 0.5 to about 1.5 oz/sqyd, with 0.5 and 0.9 oz/sqyd predominating. Cost savings results as well as a slight decrease in weight, without being bound by theory, which in turn decreases fuel costs.

The material of the subject invention not only exhibits optimal thermal, acoustic and fire retardation properties, but further does not absorb large amounts of water, does not cause or promote corrosion to the aluminum fuselage structure of the air craft, nor is it electrically conductive, or interfere with inspection of the fuselage structure for corrosion, cracks, etc. In fact, the use of the material as a sheet provides an easier viewing of the fuselage than currently utilized plastic bagged fiber glass and other materials, all while providing a cleaner, safer installation with environmentally sound properties.

The production of the rigid polymer material, or composite, sheet starts with a mold filled with slurry of polyvinyl chloride based polymer material with cellulous fibers and/or plasticizers, foaming agents and other filler ingredient mixed with an aqueous solution with anionic surfactants or isopropyl alcohol. The slurry compacts the liquid portion drains and dried, bringing the polyvinyl chloride fine particles in close contact with each other, forming a film. The content of the mold are pressed under high applied pressure and heating temperature sufficient to soften or melt the polyvinyl chloride composition while at the same time decomposing the foaming agent releasing a large amount of gaseous decomposition products within the mold. This draining step may be unnecessary, since the heating step automatically volatilizes the liquid portion of the slurry. The pressed sheet has a typical density ranging from 15% to 35% and contains fine dimension of air pockets or cells. The mold dimension may be any size, shape or curvature; but is typically as large as 1220 mm×2440 mm with a mold depth of 60 mm. Depending upon the amount of slurry poured into the mold the thickness of the sheet produced varies. For example, 10 kilos of slurry can produce a sheet that is 40 mm (1.57 inch) in thickness. If a 120 mm (4.72 inch) mold is used to produce an 80 mm (3.15 inch) board, then double the amount (20 kilograms) of raw slurry is added to the mold. The mold is then heated when under applied pressure. Changing the mold size will change the final size of board produced. In this process, there is no limit on the size of the sheet produced since it only depends on the size of the mold. The mold and the top plate may have embossed structures that replicate in the finished sheet product producing decorative construction material sheets.

The polymer mixture used for the slurry of the rigid polymer sheet material has one or more of PVC (Polyvinyl chloride) and polyvinyl acetate polymers and, in some cases, is a composite sheet also further comprises wood chips and fire retardant chemicals. These polymers melt below 190° C.

The mold with the slurry is optionally drained of the liquid ingredients and the mold is heated to below 190° C. when under applied pressure. The application of pressure and heat consolidates the slurry solid ingredients creating a sheet that may be porous with air holes which have fine dimension and the overall density of the sheet product is approximately 10% to 40% of solid polyvinylchloride sheet depending on the pressure and heat applied. The presence of closed cell air pockets may enhances the thermal resistance properties of the sheet material and exhibits high R values which are much greater than that available for typical gypsum-based construction sheets, plywood, lumber, OSB, fiberboard, particle board and the like. The sheets or lumber made by the process of the subject invention create wall boards, wall assembly systems and other construction products that provide improved heat retention to the building envelope, which significantly improves the thermal efficiency of a home or business building by eliminating or greatly reducing the phenomena known as thermal bridging, which occurs in part through a phenomena known as the framing factor. The mold may have decorative features, which are replicated on the surface of the rigid polymer material sheet. Impervious decorative sheets such as Formica sheets, aluminum foil, and stainless steel sheet may be used to cover the rigid polymer material sheet during the molding step. The polymer slurry mixture may be injected into the mold in a manner similar to resin transfer molding and heated to processing temperature.

The rigid polymer material sheet composed of the formulations of the present invention may further undergo the following treatment steps:

1) an oversized mold having the normal length and width of the sheet, but having a height typically twice the thickness of the intended sheet;
2) said mold being injected with a slurry polymer mixture and drained of the liquid ingredients of the slurry, and heated at temperatures to melt the polymers in the polymer mixture;
3) said mold being heated to a temperature below 190° C. when the mold is pressurized compacting the polymer mixture in the mold to a density ranging from 10% to 40% with closed cells of air pockets present within the sheet formed;
4) said mold having decorative markings that are transferred to the molded rigid polymer material sheet;

whereby the compaction of the polymer mixture forming a sheet with closed air cells imparts the sheet with thermal resistance and sound attenuation properties, so that the sheets may be used in building construction as well as decorative applications.

BRIEF DESCRIPTION OF THE DRAWING

The invention will be more fully understood and further advantages will become apparent when reference is had to the following detailed description of the preferred embodiments of the invention and the accompanying drawing, in which.

DETAILED DESCRIPTION OF THE INVENTION

Figure 1A:
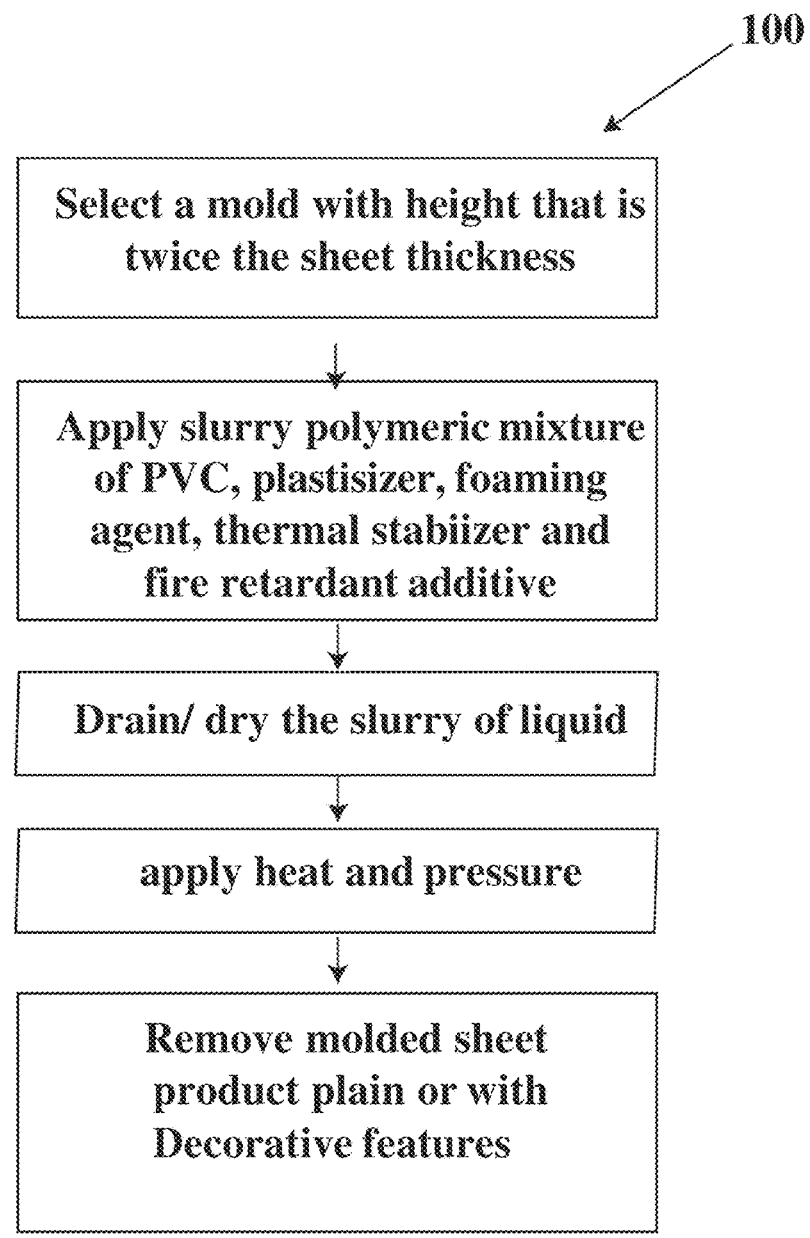
FIG. 1a illustrates the process steps in the manufacture of the rigid polymer material sheet.

The invention involves using eco-wood formulations to make building construction materials. Eco-wood formulations are utilized to make furniture, interior decoration and other decorative plates. These interior furnishings and decorations were not known to have the capacity for structural support, structure bend, and thermal and acoustic properties as a building material in the construction industry. It has been found that eco-wood formulations are suitable for use as actual building construction materials. The material has been found to have increased strength, bend capability, improved thermal insulation properties and improved acoustic insulation over current building construction materials.

Preferably, the rigid polymer material sheet for use in building construction is composed of: a polymer mixture of ultrafine particles of polyvinylchloride (PVC) impact modifier, plant fiber, coupling agent, smoke suppressant, activated clay, lubricant, an activator, environmentally friendly flame retardant, heat stabilizers, odorless crosslinking agent, foaming agent, desmopressin agent. The rigid polymer material sheet has been found to provide enhanced thermal resistance and sound attenuation properties for use in building construction, aviation or other industries. The rigid polymer material sheet preferably has the following weight percent ranges: PVC: 55-85, impact modifier: 4-15, plant fiber: 10-40, coupling agent: 0.5-5, smoke suppressant: 5-25, activated clay: 2-25, lubricant: 0.3-5, the activator: 2-10, environmentally friendly flame retardant: 5-15, heat stabilizers: 2-12, odorless crosslinking agent: 0.2-2.5, the foaming agent: 0.5-7, desmopressin agent: from 0.5-8.

Optionally, a rigid polymer material sheet for use in building construction is provided composed of: a polymer mixture of polyvinylchloride (PVC), plasticizer, nitrile rubber, PCC, stearate, zinc oxide, retardant heat, heat stabilizers, crosslinking agent, vesicant; whereby said rigid polymer material sheet provides enhanced thermal resistance and sound attenuation properties for use in building construction, aviation or other industries, and decorative applications. Preferably, the rigid polymer material sheet has the following weight percent ranges: PVC: 45-135, plasticizer: 2-15, nitrile rubber: 5-30; PCC 2-25, Stearate 0.5-3.5, Zinc Oxide: 2-10, Retardant Heat 5-15, Heat Stablizers 2-15, Crosslinking Agent 0.2-2.5, Vesicant 2.5-7.

It has been found that the rigid polymer material sheet is suitable for use for at least one member of a group consisting of: a wallboard, wall systems, and sheathing board, due to its increased thermal insulation properties and bend properties. It has also been found that the rigid polymer material sheet is suitable for use for at least one member of a group consisting of: lumber and framing structures and in wall assembly systems due to its increased thermal insulation properties and bend properties. The rigid polymer material sheet has also been found to be suitable for use as a flooring material due to its increased thermal insulation properties, as well as siding. It has further been found that the sheet is suitable for forming building board due a finding that it poses increased strength, bend capability and thermal insulation properties. The rigid polymer material sheet has also been found suitable for use for at least one member of a group consisting of: door and window and door framing due to its increased strength, bend capability, paintability and thermal insulation properties. What is more, it has been found that the rigid polymer material sheet can be used in aeronautic acoustic thermal insulation systems.

The plant fiber is pretreated in preparing the material. The plant fiber is pretreated by baking to reduce the plant fiber moisture content to 2.5% or less and it is then fed into a high-speed mixer. Coupling agent, 1-3 parts by weight, is added and the mixture stirred for 5-20 minutes. Next, the mixture is kneaded and PVC, 60-70 parts by weight, is added along with the impact modifier (9-11 parts by weight), smoke suppressant (10-20 parts by weight), from 5-15 parts by weight of clay (preferably attapulgite), lubricants (0.5-1.5) parts by weight, activator (4-6 parts by weight), environmentally friendly flame retardant (8-10 parts by weight), heat stabilizer (4-8 parts by weight), desmopressin agent (1-5 parts by weight). The mixture is kneaded at 60~80N of pressure for about 10-15 min with sweep 2 to 3 times. During the kneading process after heating, the mixer temperature rises to within a range of 140~142° C., then odorless and/or tasteless cross-linking agent (0.5-1.5 parts by weight) is added along with 1-5 parts by weight of a blowing agent. The mixture is then kneaded 2~3 min, the material, resulting rubber compound. Open mill soak is carried out, mix into the open mill thick run through twice, followed by thin through twice, cross stacker, with temperature controlled at 125~130° C. The mixture is then fed into a machine the film, the temperature of the machine's control in 105~110° C., prepared film. Next, the compound is fed into a vulcanizing mold foaming machine, curing temperature control 165~170° C., foaming time is 30~35 min, foaming dealt with relief, that was a foam. Lastly, the material is compacted, with temperature below 20° C., the cooling plate applied 15~20 min after compaction to form the rigid polymeric sheet, trimmed, cut or molded for the building construct. After the addition of a heat stabilizer 1 to 2 parts by weight of a dispersant, 0.5 to 1.5 parts by weight of an antioxidant, 0.5 to 1.0 parts by weight of an ultraviolet absorber may be added, followed by kneading with the above-described processing of other substances.

Alternatively, the composition if prepared through the following steps: (1) kneading: 45-135 parts by weight of the PVC resin, 5-30 parts by weight of nitrile rubber (NBR), 2-15 parts by weight of a plasticizer, 2-20 parts by weight of light calcium carbonate, the mixture was mixed 3.5 parts by weight of stearic acid, 2-10 parts by weight of zinc oxide, 5-15 parts by weight of a flame retardant, 2-15 parts by weight of a heat stabilizer into the mixer, and pressurized to 75 liters 7-8 KG kneading 10-12 min; 140-150° C. discharge, obtain compound; (2) Thermal refining: Step (1) mixing the resulting compound into 18-inch mill refining heat hit triangle bag; three times thinner package, and then put into 18-inch mill heat refining play triangle bag, then resort to the secondary thick packet, mixing machine temperature control 145-150° C.; (3) a film: the after step (2) soak and then put into the plastic material 18-inch mill, a refining machine temperature control 145-150° C., film thickness of 2-3 mm the film, the film is cut into strips, cooling cooled to obtain a green sheet of plastic; (4) vulcanizing mold: will be closed-cell foam vulcanization, sulfur within the step (3) the resulting sheet into the embryo glue curing machine dies 1300 tons of pressure, curing time of 30 to 35 minutes, curing temperature 160±5° C., obtain foam to be stable foam form, cooled to obtain a decorative plate products.

The polyvinylchloride used in the present invention is in the form of 100 to 150 micrometer particles produced by suspension or emulsion polymerization. The K value of the polyvinylchloride homopolymer or copolymer with polyvinyl acetate has a K value greater than 65 representing a molecular weight of 60,000 as shown in the graph in FIG. 1b, showing a graph reproduced from PVC Plastics by W. V. Titow. A K value of 50 is a low molecular weight soft PVC while a K value of 80 is a high molecular weight strong PVC.

When a plasticizer is added to the fine power of polyvinylchloride based resin, it enters the resin molecule at the atomic level creating screens between polymer chains or hinge locations between polymer chains promoting polymer flexibility. Since the polyvinylchloride foams produced have a very thin polymer layer surrounding the air cell, it requires a great amount of flexibility to prevent crack propagation and fracture. Conventional phthalate plasticizers have been determined to be a biohazard according to U.S. Consumer Product Safety Commission at https://www.cpsc.gov/PageFiles/98260/dinp.pdf. For this reason, non-phthalate plasticizers, such as DINCH are preferred.

A foaming agent is kneaded to allow the formation of a plurality of micron-sized air cells to produce the low-density polyvinylchloride polymeric sheet. When the polymeric composition is heated in a mold, at a specific temperature the polymer softens. If the foaming agent releases a large volume of gaseous decomposition products at the same time when the polyvinylchloride resin softens, a closed cell microcellular structure is formed. While a number of foaming agents are available, their decomposition temperature does not match the softening point of polyvinylchloride resin which is in the range of 170 to 190° C. Specifically, azodicarbonamide foaming agent has a decomposition temperature of 215 to 219° C., but it may be bought down using a ZnO kicker. Using this combination micro fine cells are formed in the low density polyvinylchloride sheet.

Another requirement for the formation of the microcellular sheet during foaming step requires the ultrafine particles of polyvinylchloride particle and wood cellulous or ultra-fine cellulous particles to touch each other, since the quantity of polyvinylchloride in the sheet is quite small. This is accomplished by mixing the polyvinyl ultrafine particles along with additives with and anionic aqueous solution of isopropyl alcohol forming a slurry. During drying of the slurry, the surface tension brings the polyvinylchloride particles close to each other, forming a film.

The air cells formed have to be stabilized so that they remain until the polyvinylchloride polymer sets. The stabilizers are typically organic or inorganic compounds such as barium/zinc, calcium/zinc or organ tin stabilizers The present invention uses two distinctly different low-density polyvinylchloride sheets. The first embodiment uses fine particles of polyvinylchloride homopolymer in combination with wood cellulose or wood fibers and/or a higher amount of DINCH non-phthalate plasticizer. A typical example of the polymer slurry used in the mold is shown below.

| | |
|---|---|
| Suspension PVC K value 70 (S-PVC) | 100.0 parts [55-85% wt. percent] |
| PVC | 65 |
| Impact modifier | 5 |
| Mesh wood fiber plant | 10 |
| Coupling agent | 0.5 |
| Smoke suppressant | 5 |
| Clay | 3 |
| Lubricant | 0.5 |
| Zinc oxide | 2 |
| Green flame retardant | 5 |
| Heat stabilizer | 2 |
| tasteless crosslinking agent | 0.5 |

The subject invention's samples were found to have superior per inch R Value insulation properties to Fiberglass. Measured thermal properties and the R values of the different thickness specimens are shown as a comparative basis as compared to other commonly available construction materials.

Subject Invention Vs. Common Building Material
with Identical Thickness R-Value Comparison

| Material: | Common | Subject Invention Foaming Board | |
|---|---|---|---|
| Building/Sheathing Board | Building Material Thickness | .145 gm/cc R-Value | .165 gm/cc R-Value |
| | Thickness | R-Value | |
| Gypsum Wall Board | ½" | 0.45 | 2.06 | 1.93 |
| Plywood | ½" | 0.62 | 2.05 | 1.93 |
| Plywood | ¾" | 0.94 | 3.03 | 2.95 |
| Plywood | 1" | 1.25 | 4.00 | 3.91 |
| Fiber board sheathing | ½" | 1.32 | 2.02 | 1.96 |
| Fiber board sheathing | 1" | 2.64 | 4.02 | 3.92 |
| Medium Density Particle Board | ½" | 0.53 | 2.03 | 1.97 |
| Fiberglass sheathing | ¾" | 3.00 | 3.03 | 2.93 |
| Fiberglass sheathing | 1" | 4.00 | 4.00 | 3.91 |
| Fiberglass sheathing | 1½" | 6.00 | 6.05 | 5.87 |

| | Common | Subject Invention Foaming Board | |
|---|---|---|---|
| Material: Insulating Materials (Per 1 inch Thickness) | Building Material Thickness | .145 gm/cc R-Value | .165 gm/cc R-Value |
| Fiberglass Batt | 1" | 3.14 | 4.02 | 3.93 |
| Fiberglass Blown (Attic) | 1" | 2.20 | 4.02 | 3.93 |
| Fiberglass Blown (Wall) | 1" | 3.20 | 4.02 | 3.93 |
| Rock Wool Batt | 1" | 3.14 | 4.02 | 3.93 |
| Rock Wool Blown (Attic) | 1" | 3.10 | 4.02 | 3.93 |
| Rock Wool Blown (Wall) | 1" | 3.03 | 4.02 | 3.93 |
| Cellulous Blown (Attic) | 1" | 3.13 | 4.02 | 3.93 |
| Cellulous Blown (Wall) | 1" | 3.70 | 4.02 | 3.93 |
| Vermiculite | 1" | 2.13 | 4.02 | 3.93 |
| Autoclaved Aerated Concrete | 1" | 3.90 | 4.02 | 3.93 |
| Urea Terpolymer Foam | 1" | 4.48 | 4.02 | 3.93 |
| Rigid Fiberglass (>4 lb/ft3) | 1" | 4.00 | 4.02 | 3.93 |
| Expanded Polystyrene (Beadboard) | 1" | 4.00 | 4.02 | 3.93 |
| Extruded Polystyrene | 1" | 5.00 | 4.02 | 3.93 |
| Polyurethane (foamed-in-place) | 1" | 6.00 | 4.02 | 3.93 |
| Foil Faced Polyisocyanurate | 1" | 6.00 | 4.02 | 3.93 |

This invention relates to a molding process for producing rigid polymer polyvinyl chloride-based sheet material, or composite, sheet. Slurry of polymer powder with additives and fillers and fire retardant material is fed to an oversized mold whose height is approximately twice that of the sheet thickness desired while width and the length of the mold are close to that of the desired dimensions of the sheet. The liquid portion of the slurry is optionally drained and dried first and the mold is heated to a temperature below 190° F. when the mold is pressurized by a die set. This application of pressure and temperature forms the sheet with a density ranging from about 5% to 98%, and preferably from about 10% to about 40%, of a solid polyvinyl chloride sheet with closed air cells finely distributed within the sheet. The presence of closed air cells enhances the thermal resistance of the sheet product as well as provide sound absorption characteristics. The die may have milled decorations, which are replicated in the final product.

The rigid polymer sheet rated product has a low density, and water does not penetrate the product. The polymer slurry mixture used comprises PVC (Polyvinyl chloride) and polyvinyl acetate polymers along with wood chip and flame retardant additives, depending on the application of the final product. External casing sheets may be used to cover the rigid polymer sheet during the heating and pressure application step to bond the encasing sheets thereto. The rigid polymer composite sheet is inherently fire retardant due to the usage of PVC in the polymer infiltration composition to release chlorine and expel oxygen near a flame, thereby extinguishing the flame.

The objective of the invention is to utilize eco-wood formulations in building construction materials making a durable rigid polymer sheet, which may be painted and is useful as a building material. The process used herein is very reproducible and produces sheets with exceptional properties. It does not crack when bent 90 degrees or more and is extremely shock absorbing even though it is rigid. Accordingly, the rigid polymer sheet is well suited for wall boards, lumber and wall assembly systems.

The rigid polymer filled foam composite is the newest construction material developed as detailed herein. The rigid polymer composite sheet is anti-flaming, fireproof, moisture proof, anti-corrosion, termite proof, formaldehyde free. It exhibits a low amount of smoke, and is highly resistant to flame penetration. The surface of the sheet can be treated by spray coating, and can be adhered to many kinds of materials. In combination, these features have made the rigid polymer filled foam composite an excellent eco-green construction material.

The rigid polymer sheet can be used as a replacement for wooden board, thus reducing deforestation, and protecting the environment. At the same time, it is waterproof, moisture proof, soundproof, vibration absorbing, resistant to acid and alkali, resistant to climate ageing, anti-flaming and fireproof. In these aspects, the rigid polymer filled foam material sheet is superior to all other building materials.

Different kinds of materials are added into the rigid polymer filled foam material sheet for different purposes:
1. For wood frame construction, wall, floor, and ceiling assemblies, interior/exterior home decoration, large amount of plant fibers (such as wood chips, husk of rice, etc.) are added, to increase the hardness and nail holding ability;
2. For application in cars, yachts and ships, aircrafts, and bullet trains, and application as embossing materials, thermal preservation materials, nitrile butadiene rubber (NBR) is added to greatly improve its performance of shaping, toughness, and impact resistance, and make it much easier for hot pressing, embossing, bending and carving;
3. A smoke suppressant, calcium stearate powder, and flame retardant are added to increase its performance of fireproof and impact resistance, to reduce the density of smoke, and to make it more ecofriendly.
4. This rigid polymer sheet is clearly the newest formaldehyde free, eco-green, flame resistant and fireproof building material.

Features and Usages of Rigid Polymer Filled Foam Material Sheet
1. Due to its lightweight, large range of density and flexibility, hard body, and easy installation, it can be used in building material industry as a suitable eco green replacement for wood and engineered wood materials such as but not limited to Framing Lumber, Plywood, Particle board, Oriented strand board (OSB) Type A,B,C, Medium density fiberboard (MDF), High Density fiberboard (HDF), Glued laminated timber (glulam), Laminated veneer lumber (LVL), hardwood, Cross-Laminated Timber (CLT), Structural Composite Lumber (SCL), Laminated strand lumber (LSL), Parallel strand lumber (PSL) 610, Timber, Finger-jointed lumber, High and Medium Density Overlay plywood (HDO and MDO). In such applications as but not limited to subflooring, flooring, wall and roof sheathing, ceiling and deck sheathing, lumber, timber, rafters, exterior wall studs, purlins, headers, garage door headers, door jams, doors, crown moldings, batten moldings, rim boards, studs, columns, concrete forming, siding, mezzanine decks, and furniture; in addition in transportation industries such as for aircrafts as Aviation thermal acoustic insulation systems, as the roofs, bodies, and core layers of ships, cars, trucks, and trains. Many kinds of materials can be easily adhered to its surface.

2. Due to its good performance of fire resistance and self-extinguishing, it can be used as fireproof doors, fire doors fill core, I Joists (webs and flanges), roof trusses, ridge beams, floor beams, lumber, sheathing board, sauna timber, flooring and furniture for home usages, and in commercial buildings, hotels, and other public areas. It can also be used in framing structures and as the main body of archaizing buildings and temples.

3. Due to its good performance of water-proof and moisture-proof, it can be made into kitchen cabinets, bathroom fixtures, countertops, and bathroom decoration materials. It is also a good choice for outdoor projects, waterfront facilities, road and bridge projects, and templates for construction projects.

4. Due to its good anti-corrosion and termite-proof performance, it is a good choice for industrial anti-corrosion projects, industrial containers, industrial tanks, highway panels and archaizing building repairing projects. It is also a good choice as flooring or subflooring, siding, wall assembly systems, and roof for home usages due to its high R-value and waterproof characteristics.

5. As its surface can precede spray treatment, and due to its very low thermal transfer and good thermal preservation, it can be used in walk-in/free standing coolers, cold storage insulation board, refrigerated box truck bodies, refrigerated semi-tractor trailers, freezers, and as the internal and external walls for hotels, and other buildings.

6. Due to its excellent insulating and flexibility properties, it can be used as thermal insulation lumber, thermal insulation sheets, aviation insulation systems, thermal insulation board, structural insulated panels, brick or stone insulation panels, exterior insulation blocks, as the bodies of electrical appliances, bodies of outdoor transformers, and circuit insulation boards, etc.

7. The rigid polymer filled foam material sheet is created by hot pressing first followed by cold pressing, and it is easily carved; thus is well suited for use in melamine board, melamine flooring board, melamine cabinet board, polyboard laminate, cabinets, wall and ceiling decoration board, embossed wall and ceiling decoration board, ceiling tiles, ceiling medallions, cloth veneer acoustic soft pack panel, cloth veneer soundproof hard pack acoustic panel advertising boards, office furniture, entertainment centers, embossed leather panel for video wall backdrop screen, and hospital furniture.

Figure 1B:
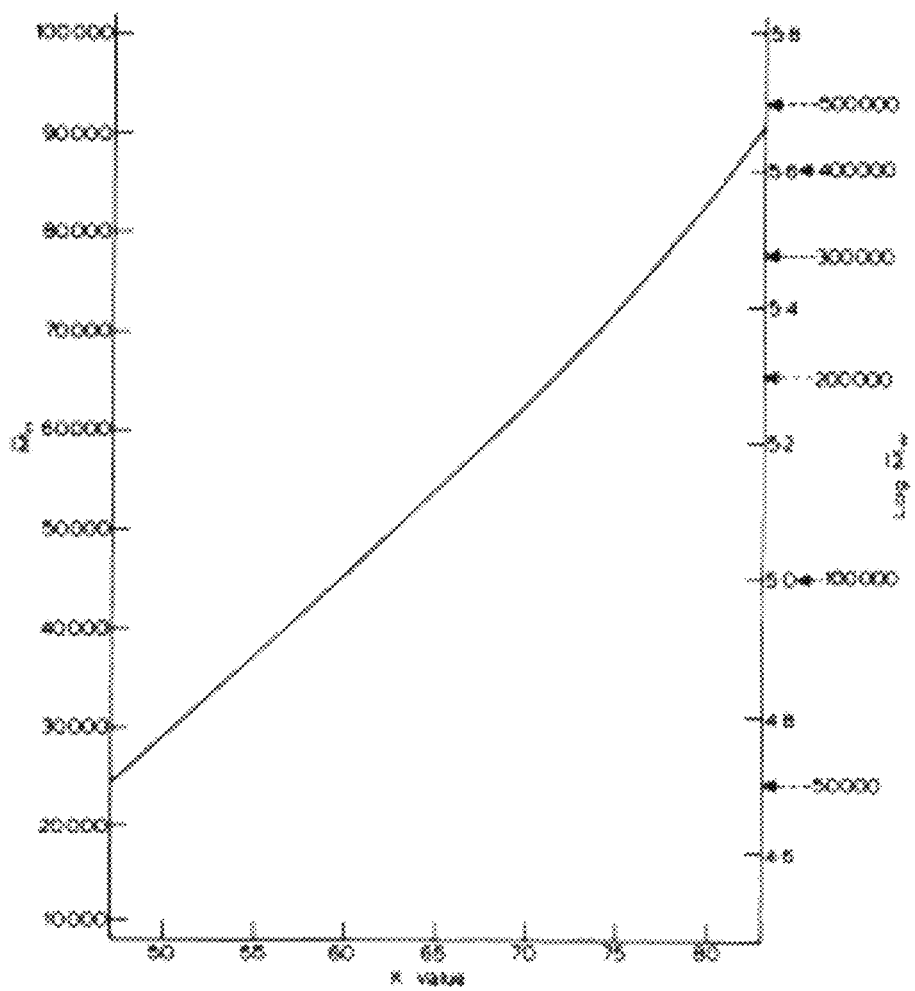
FIG. 1b illustrates a graph showing the relationship between the Fikentscher K value and the molecular weight of PVC polymers.

FIG. 1a illustrates generally at 100 the process steps involved in the creation of the rigid polymer filled foam material sheet. The polyurethane or rubber foam has a plurality of pores, which will be filled with a polymer during the process, as hereinafter described, thereby creating a rigid polymer filled foam material sheet. In the first step, the foam is cut to shape according to the desired product size. In the second step, a mixture of polymers including one or more of ABS (Acrylonitrile Butadiene Styrene), PMMA (Poly methyl methacrylate) and PVC (Polyvinyl chloride) polymers is mixed with a solvent to create a slurry. Additional ingredients may include wood chips/wood fiber/finely-ground cellulose is wood cellulose, fire retardant materials such as calcium silicate. The foam is completely covered with the slurry and in one embodiment is allowed to dry. In the next step, the polymer covered foam is placed in a die of a heating and pressing machine. Any solvent, if present, is evaporated quickly. ABS melts at about 105° C., PMMA melts at about 165° C., and PVC melts at about 160° C. When the mold is heated to temperatures below 170° C., all the polymeric ingredients are softened. Thus, during the heating process, the polymer slurry composition densifies to a formsheet structure. When the densification is complete after a selected process time, the rigid polymer material sheet may be removed from the mold.

PVC has a large amount of chlorine and when the rigid polymer filled foam material sheet is exposed to flame, the degradation of PVC releases a large amount of chlorine that extinguishes the flame and thereby provides fire retardant properties to the rigid polymer filled foam material sheet.

FIG. 1b is a graph showing the relationship between the Fikentscher K value and the molecular weight of PVC polymers. Preferably, the polyvinylchloride used in the present invention is in the form of 100 to 150 micrometer particles produced by suspension or emulsion polymerization. The K value of the polyvinylchloride homopolymer or copolymer with polyvinyl acetate has a K value greater than 65 representing a molecular weight of 60,000 as shown in the graph below reproduced from PVC Plastics by W. V. Titow. A K value of 50 is a low molecular weight soft PVC while a K value of 80 is a high molecular weight strong PVC.

Figure 2:
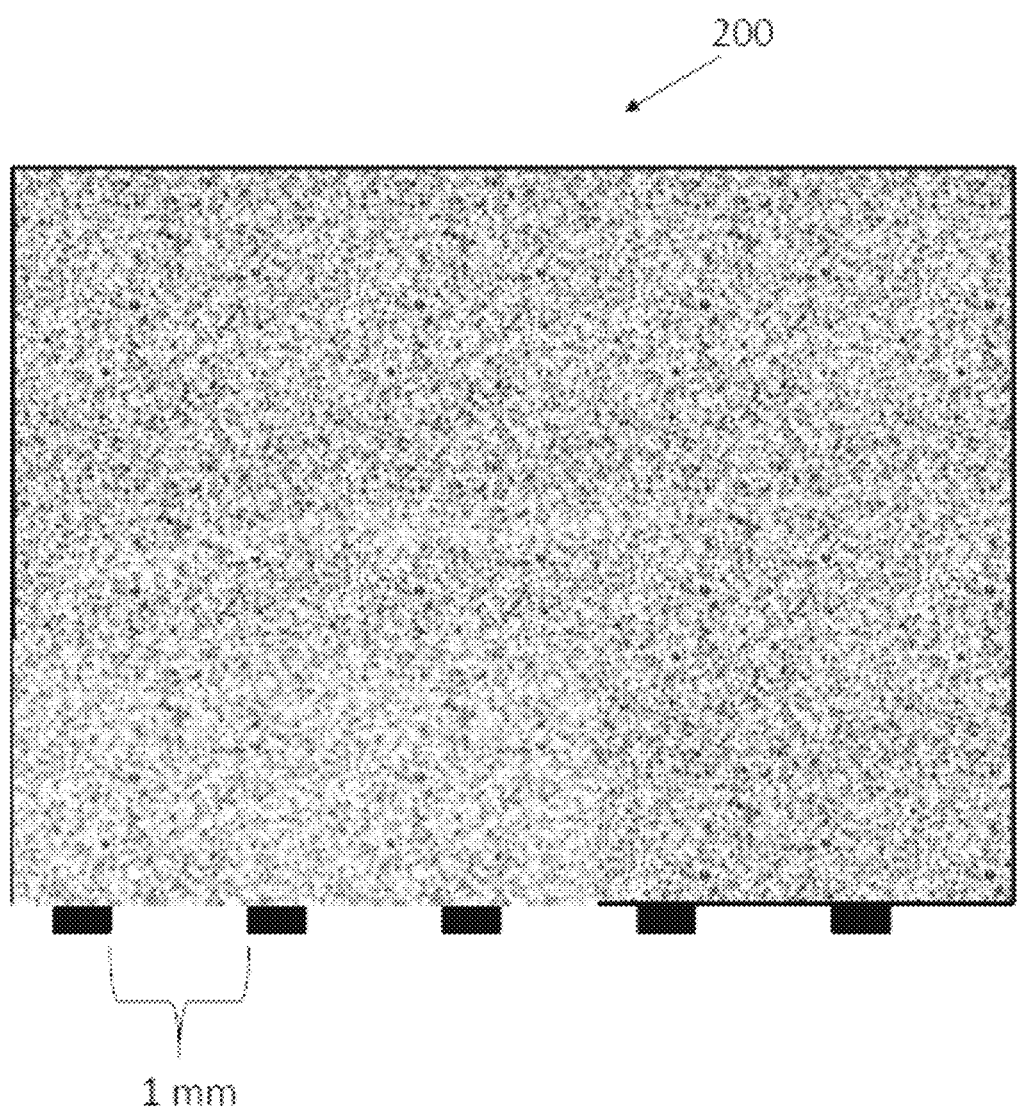
FIG. 2 is a micrograph of the rigid polymer material sheet.

FIG. 2 illustrates generally at 200 a micrograph of the rigid polymer material sheet. The millimeter marker is shown in the figure. Individual air cells of the polymer sheet are clearly seen. This sample is sample A, which had a dimension of 25 cm length. 13 cm width and 1.2 cm in thickness with a volume of 390 cc and weighed 77 grams. Thus the density of this sample A is 0.197 gm/cc.

Figure 3:
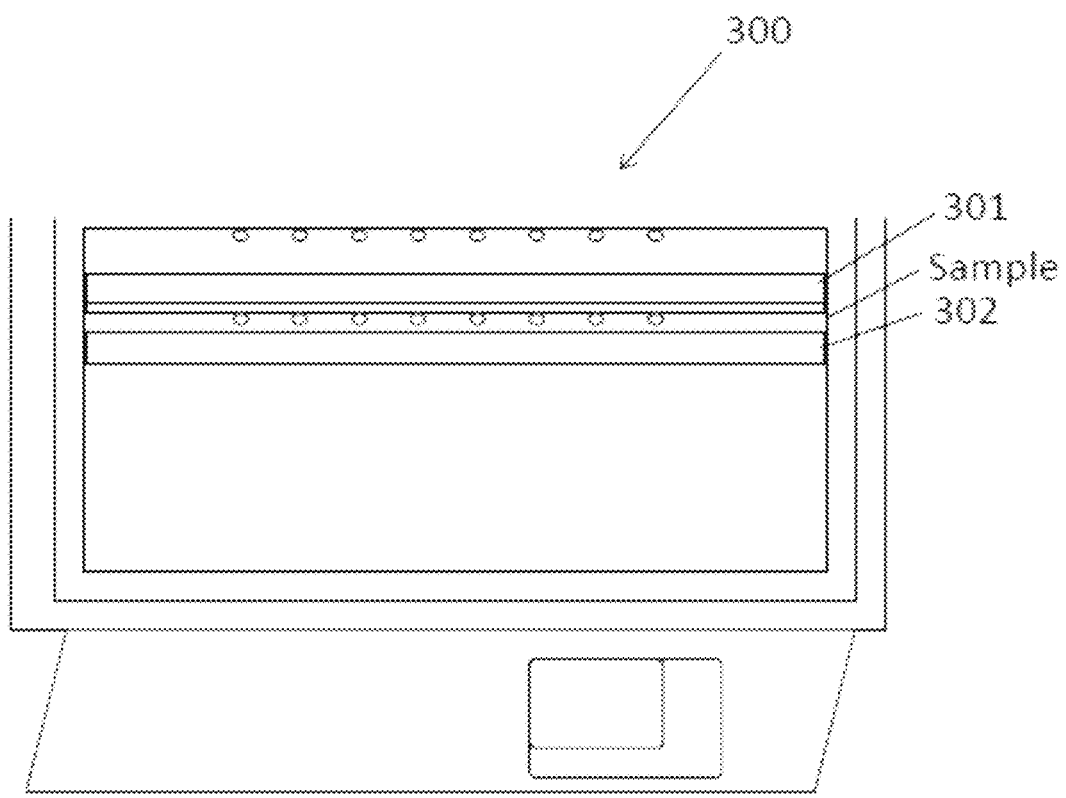
FIG. 3 illustrates thermal resistance or R-value measurement procedure.

FIG. 3 illustrates generally at 300 the method used for measuring the thermal conductivity of the sheet. The subject sheet can be made into different hardness for different Industries, and different Industrial end uses and applications. The formula can be adjusted to fit virtually any Industrial application or end use. Heat flow meter testing in accordance with ASTM C518 was conducted on 0.145 gm/cc and 0.165 gm/cc density specimens with varying thicknesses resulting in R values (see below). Chambers 301 and 302 are maintained at different temperatures and heat flow is measured.

ASTM Data Results

| ASTM C518-10 | | .145 gm/cc | .165 gm/cc |
|---|---|---|---|
| R Value | (½" thick) | 2.00 | 1.96 |
| | (¾" thick) | 3.04 | 2.94 |
| | (1" thick) | 4.01 | 3.90 |
| | (1½" thick) | 6.05 | 5.86 |

The subject invention's samples were found to have superior per inch R Value insulation properties to Fiberglass. Yet also exhibits vastly different material properties and attributes. *Testing Results ASTM C518-10 (above)

The measured thermal properties and the R values of the different thickness specimens are shown as a comparative basis as compared to other commonly available construction materials.

Subject Invention Vs. Common Building Material with Identical Thickness R-Value Comparison

| Material: Building/Sheathing Board | Common Building Material Thickness | Common R-Value | Subject Invention Foaming Board .145 gm/cc R-Value | Subject Invention Foaming Board .165 gm/cc R-Value |
|---|---|---|---|---|
| Gypsum Wall Board | ½" | 0.45 | 2.00 | 1.96 |
| Plywood | ½" | 0.62 | 2.00 | 1.96 |
| Plywood | ¾" | 0.94 | 3.04 | 2.94 |
| Plywood | 1" | 1.25 | 4.01 | 3.90 |
| Fiber board sheathing | ½" | 1.32 | 2.00 | 1.96 |
| Fiber board sheathing | 1" | 2.64 | 4.01 | 3.90 |
| Medium Density Particle Board | ½" | 0.53 | 2.00 | 1.96 |
| Fiberglass sheathing | ¾" | 3.00 | 3.04 | 2.94 |
| Fiberglass sheathing | 1" | 4.00 | 4.01 | 3.90 |
| Fiberglass sheathing | 1½" | 6.00 | 6.05 | 5.86 |

| Material: Insulating Materials (Per 1 inch Thickness) | Common Building Material Thickness | Common R-Value | Subject Invention Foaming Board .145 gm/cc R-Value | Subject Invention Foaming Board .165 gm/cc R-Value |
|---|---|---|---|---|
| Fiberglass Batt | 1" | 3.14 | 4.01 | 3.90 |
| Fiberglass Blown (Attic) | 1" | 2.20 | 4.01 | 3.90 |
| Fiberglass Blown (Wall) | 1" | 3.20 | 4.01 | 3.90 |
| Rock Wool Batt | 1" | 3.14 | 4.01 | 3.90 |
| Rock Wool Blown (Attic) | 1" | 3.10 | 4.01 | 3.90 |
| Rock Wool Blown (Wall) | 1" | 3.03 | 4.01 | 3.90 |
| Cellulous Blown (Attic) | 1" | 3.13 | 4.01 | 3.90 |
| Cellulous Blown (Wall) | 1" | 3.70 | 4.01 | 3.90 |
| Vermiculite | 1" | 2.13 | 4.01 | 3.90 |
| Autoclaved Aerated Concrete | 1" | 3.90 | 4.01 | 3.90 |
| Urea Terpolymer Foam | 1" | 4.48 | 4.01 | 3.90 |
| Rigid Fiberglass (>4 lb/ft3) | 1" | 4.00 | 4.01 | 3.90 |
| Expanded Polystyrene (Beadboard) | 1" | 4.00 | 4.01 | 3.90 |
| Extruded Polystyrene | 1" | 5.00 | 4.01 | 3.90 |
| Polyurethane (foamed-in-place) | 1" | 6.00 | 4.01 | 3.90 |
| Foil Faced Polyisocyanurate | 1" | 6.00 | 4.01 | 3.90 |

| Material: Siding | Common Building Material Thickness | Common R-Value | Subject Invention Foaming Board .145 gm/cc R-Value | Subject Invention Foaming Board .165 gm/cc R-Value |
|---|---|---|---|---|
| Hardboard | ½" | 0.34 | 2.00 | 1.96 |
| Plywood | ½" | 0.62 | 2.00 | 1.96 |
| Plywood | ¾" | 0.93 | 3.04 | 2.94 |
| Wood Bevel Lapped | | 0.80 | 3.04 | 2.94 |
| Aluminum/Steel/Vinyl (not insulated) | | 0.61 | 3.04 | 2.94 |
| Aluminum/Steel/Vinyl (½" insulation) | | 1.80 | 3.04 | 2.94 |

| Material: Interior Finish Materials | Common Building Material Thickness | Common R-Value | Subject Invention Foaming Board .145 gm/cc R-Value | Subject Invention Foaming Board .165 gm/cc R-Value |
|---|---|---|---|---|
| Gypsum Board (Drywall) | ½" | 0.45 | 2.00 | 1.96 |
| Paneling | ¼" | 0.31 | 1.00 | 1.00 |
| Paneling | ½" | | 2.00 | 1.96 |
| Paneling | ¾" | | 3.04 | 2.94 |
| Paneling | 1" | | 4.01 | 3.90 |

| Material: Flooring Materials | Common Building Material Thickness | Common R-Value | Subject Inveinton Foaming Board .145 gm/cc R-Value | Subject Inveinton Foaming Board .165 gm/cc R-Value |
|---|---|---|---|---|
| Plywood | ¾" | 0.94 | 3.04 | 2.94 |
| Plywood | 1" | 1.25 | 4.01 | 3.90 |
| Particle Board (underlayment) | 1" | 1.31 | 4.01 | 3.90 |
| Hardwood Flooring | ¾" | 0.68 | 3.04 | 2.94 |
| Hardwood Flooring | 1" | 0.91 | 4.01 | 3.90 |
| Tile, Linoleum | | 0.05 | 2.00 | 1.96 |
| OSB Insulated Subfloor Panel System | 2" | 7.00 | 8.02 | 7.80 |

| Material: Doors | Common Building Material Thickness | Common R-Value | Subject Invention Foaming Board .145 gm/cc R-Value | Subject Invention Foaming Board .165 gm/cc R-Value |
|---|---|---|---|---|
| Wood Hollow Core Flush | 1¾" | 2.17 | 7.05 | 6.84 |
| Wood Solid core Flush | 1¾" | 3.03 | 7.05 | 6.84 |
| Wood Solid core Flush | 2¼" | 3.70 | 9.02 | 8.80 |
| Insulated metal door (2" w/urethane) | 2" | 15.00 | 8.02 | 7.80 |

In all cases, the sheet of the present invention provides better R values as compared to any of the commercially available construction material. The sheet of the present invention is also Fire Proof, Water Proof (water absorption 0.81%), Termite Proof, Sound Proof, Acid Proof, and is the next state of the art Eco Green Building Material comprised of 100% Formaldehyde Free components.

Sound/Acoustic properties are set forth below:

Acoustical Performance Test Report: Density 0.145 gm/cc and 0.165 gm/cc

Tube Diameter: 57 mm

Impedance tube tests were performed on Density 0.145 gm/cc and 0.165 gm/cc samples. Three test specimens were provided for each. Test methods were conducted in accordance with ASTM E1050-12, Standard Test Method for Impedance and Absorption of Acoustical Materials Using a Tube, Two Microphones and A Digital Frequency Analysis System. Instrumentation used is set forth below.

Instrumentation:

| Instrument | Manufacturer | Model | Description | ATI Number | Date of Calibration |
|---|---|---|---|---|---|
| Analyzer | Agilent | 35670A | Environmental Noise Analyzer | Y002929 | June 2013* |
| Microphone One | G.R.A.S | Type 40 AR | ½", pressure type, condenser microphone | 063359 | September 2014 |
| Microphone One Preamp | G.R.A.S | Type 26 AK | ½", preamplifier | Y003251 | September 2014 |
| Microphone Two | G.R.A.S | Type 40 AR | ½", pressure type, condenser microphone | Y003245 | September 2014 |
| Microphone Two Preamp | G.R.A.S | Type 26 AK | ½", preamplifier | Y003248 | September 2014 |
| Microphone Calibrator | Larson Davis | CAL 200 | PistonphoneCalibrator | 065327 | September 2014 |
| Driver | JBL | 2426H | Compression Driver | 005719 | N/A |
| Equalizer | Rane | RPE 228 | Digital equalizer | 005081 | N/A |
| Weather Station | Davis | 615C | Weather station | Y003257 | July 2014 |
| 57 mm Impedance Tube | Architectural Testing, Inc. | N/A | 57 mm Impedance tube with microphone holder, stand, and acrylic sample holder with plunger | 005712 | N/A |

*Note:
The calibration frequency for this equipment is every two years per the manufacturer's recommendation.

Signal Processing Parameters:

| | |
|---|---|
| Frequency Resolution | 1600 Lines |
| Frequency Span | 3200 Hertz |
| Averaging Type | RMS |
| Number of Averages | 25 |
| Windowing Function | Hanning Window |
| Overlap | 66.70% |

N/A-Non Applicable

Each specimen was installed flush with the open end of the specimen holder. Any gaps that existed between the specimen and holder were sealed with petroleum jelly. The holder was installed onto the open end of the impedance tube. Random noise was generated in the tube, and 50 measurements were conducted and averaged. The air temperature, relative humidity and atmospheric pressure conditions were monitored and recorded during the test measurements. The results for the specimens were averaged. The r/pc, x/pc, gpc, bpc and the normal incidence sound absorption coefficients were calculated. Density 0.145 gm/cc:

| Specimen | Description | Thickness (cm) | Weight (g) |
|---|---|---|---|
| A | Foam board | 1.875 | 7.529 |
| B | Foam board | 1.920 | 7.560 |
| C | Foam board | 1.915 | 7.560 |

Density 0.165 gm/cc:

| Specimen | Description | Thickness (cm) | Weight (g) |
|---|---|---|---|
| A | Foam board | 2.017 | 24.012 |
| B | Foam board | 2.019 | 24.591 |
| C | Foam board | 2.019 | 24.560 |

| | ASTM E1050 | |
|---|---|---|
| | .145 gm/cc | .165 gm/cc |
| Acoustic Absorption | 0.03-0.17 (250-2000 hz) No Absorption | 0.03-0.05 (250-2000 hz) No Absorption |

Density 0.145 gm/cc:

Summary of Test Results

| Data File No. | 1/3 Octave Normal Incidence Sound Absorption Coefficients at the Octave Band Frequencies | | | | | | |
|---|---|---|---|---|---|---|---|
| | 63 | 125 | 250 | 500 | 1000 | 2000 | 4000 |
| E7935.01 | N/A | N/A | 0.03 | 0.03 | 0.05 | 0.17 | N/A |

N/A indicates the frequency is not applicable to the respective tube diameter.

Density 0.165 gm/cc

Summary of Test Results

| Data File No. | 1/3 Octave Normal Incidence Sound Absorption Coefficients at the Octave Band Frequencies | | | | | | |
|---|---|---|---|---|---|---|---|
| | 63 | 125 | 250 | 500 | 1000 | 2000 | 4000 |
| E7255.01A | N/A | N/A | 0.03 | 0.03 | 0.02 | 0.05 | N/A |

N/A indicates the frequency is not applicable to the respective tube diameter.

Physical properties of the samples were determined, as set forth below 0.145 gm/cc density:

| ASTM D 635 Rate of Burn | PASS - Failure to sustain burn corresponds to a CC1/HB classification. |
|---|---|

| ASTM C 367 Hardness | 281 LBF Average |
|---|---|

| ASTM C 367 Friability | 0.05 Average Mass Loss |
|---|---|

| ASTM C 367 Sag Test | Average Sag | 0.033 |
|---|---|---|
| | Ave Recovery | 0.037 |

*conditioning for 17 hours at 32° C. and 90% relative humidity
*6 hour "wet" recovery period at 23° C. and 50% relative humidity

| ASTM C367 Transverse Strength | Machine Direction Average | Cross Direction Average |
|---|---|---|
| Width | 3.082 | 3.085 |
| Depth | 0.0754 | 0.0751 |
| Max Load (lbf) | 33.8 | 32.4 |
| Max Deflection (in) | 3.502 | 3.598 (Maximum range of Testing machine capability) |
| Modulus of Rupture (psi) | 347 | 335 |

The subject foaming boards can be manufactured into standard building board size, and any standard lumber size specification. For example, the molds and machinery to form the foaming boards are typically available in standard size of 1220 mm×2440 mm (48 inch×96 inch). Therefore the variance is the thickness of the mold, which in turn produces different thicknesses of slab. Once the finished slab has been removed from the mold, the board can be cut into building board sizes or lumber sizes according to needs and applications.

Figure 4:
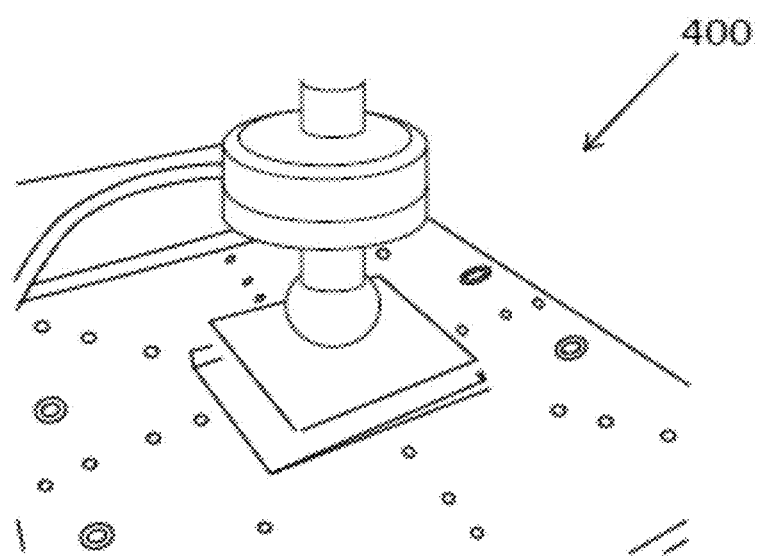
FIG. 4 illustrates hardness measurement of rigid polymer sheet.
Figure 4:
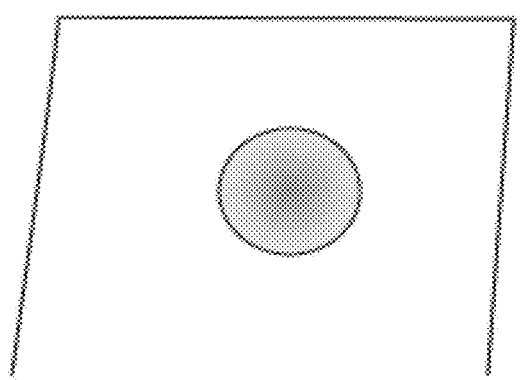

FIG. 4 illustrates at 400 the harness measurement of the rigid polymer sheet having 0.145 gm/cc density according to ASTM C 36. The figure shows the test set up and the indentation. Hardness test was conducted on five 4 in. by 4 in. specimens. A compressive load was applied to each specimen utilizing an Instron Universal Testing Machine (ICN: 005741) through a 2 in. diameter ball at a rate of 0.10 in/min until a sample penetration of 0.250 in was achieved.

Hardness Results

| .145 gm/cc density | Thickness (in.) | Hardness (lbf) |
|---|---|---|
| Average | 0.7542 | 281 |

Figure 5:
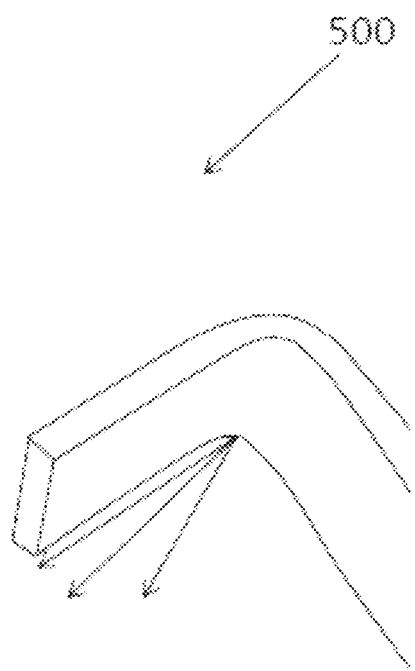
FIG. 5 illustrates bend test measurement of the rigid polymer sheet.

ASTM C 367—Transverse Strength tests were conducted. Five, 3 in. by 14 in. by 0.750 in. specimen having a density of 0.145 gm/cc were cut from the submitted panels in a machine direction, and another five were cut in the cross direction. Test specimen dimensions were measured using a 12 inch (by 0.001 inch) digital caliper (ICN: 004722). Specimens were individually mounted in an Instron Model 3369 Universal Testing Machine (ICN: 005740) using a three-point flexural loading setup. Test specimens were supported at a span of 12 in. The diameter of the loading nose and the support rods were 1.25 in. The specimens were loaded at a rate of 0.50 in/min until either peak load was achieved or a deflection of 3.5 in. was reached. As illustrated by FIG. 5, the specimens exhibited excellent flexibility exceeding 110°. Midspan deflection was continuously recorded during the loading process using the crosshead movement of the test machine.

Transverse Strength Results

| MD results | Width (in) | Depth (in) | Maximum Load (lbf) | Maximum Deflection (in) | Modulus of Rupture (psi) |
|---|---|---|---|---|---|
| Average | 3.082 | 0.754 | 33.8 | 3.502 | 347 |

| CD results | Width (in) | Depth (in) | Maximum Load (lbf) | Maximum Deflection (in) | Modulus of Rupture (psi) |
|---|---|---|---|---|---|
| Average | 3.085 | 0.751 | 32.4 | 3.598 | 335 |

ASTM C 367—Friability tests were conducted. Twelve, 1 in. by 1 in. by 0.750 in. specimens were weighed using a Mettler Toledo analytical balance (ICN: 003449) and placed within the oak friability tumbler along with twenty-four, ¾" oak cubes. The tumbler was closed to prevent the test materials from being ejected and the tumbler was rotated around its axis at a rate of 60 rpm for 10 minutes. The sample set was then removed from the tumbler and weighed for mass loss. They were then reinserted into the tumbler without the previous debris being removed, and the mechanism operated for 10 additional minutes. At the conclusion of the second 10 minutes, the samples were removed and reweighed, resulting in a final mass loss.

Friability Test Results

| | Initial weight | 10 Minute Weight (g) | Mass Loss (%) | Next 10 min weight (g) | Mass Loss (%) |
|---|---|---|---|---|---|
| Average | 2.1824 | 2.1813 | 0.05% | 2.1801 | 0.11 |

FIG. 5 illustrates at 500 the bending of the rigid polymer sheet. The sample is reversibly bent to 110° without cracks. It represents the only building board used for drywall, or wall assembly sheathing that can flex to an angle exceeding 120 degrees and then return to its original shape without any breaking, cracking or exterior flawing in its appearance or rigidity.

Other test samples marked Sample B had a dimension of 25 cm length. 15 cm width and 2 cm in thickness with a volume of 750 cc and weighed 275 grams. Thus the density of this sample B is 0.367 gm/cc. A third sample, Sample C had a dimension of 24.5 cm length. 12 cm width and 0.5 cm in thickness with a volume of 147 cc and weighed 275 grams. Thus the density of this sample C is 0.558 gm/cc. Clearly the rigid polymer sheet fabrication process such as the amount of slurry added during molding of the sheet, the temperature of the mold and the pressure applied determines the density. In addition, the presence of decorative structure on the sheet increases both the hardness and the density of the sheet formed.

Wall Assembly Systems—

Foaming Board Composite Wall Assembly Systems and Foaming Board Related Products of the subject invention eliminates or greatly reduces "Thermal Bridging" and "Framing Factor" to the wall assembly and achieves a 114.33% increase in R-Value (using California Energy Commission of 25% framing factor) throughout the entire wall assembly system and building envelope creating a thermal break and uniform increase in thermal resistance.

A thermal bridge, also called a cold bridge, is an unwanted path for heat flow that bypasses the main insulation of a building envelope. A thermal bridge is a fundamental of heat transfer where a penetration of the insulation layer by a highly conductive or non-insulating material takes place in the separation between the interior (or conditioned space) and exterior environments of a building assembly (also known as the building enclosure, building envelope, or thermal envelope).Placing a good conductor in parallel with good insulation is often referred to as "thermal bridging" because it provides a path for heat flow that bypasses the main insulation.

Energy loss inside the building envelope occurs by two forces conduction and convection. Conduction is the transfer of heat through a solid material, which is what insulation is designed to prevent, and is responsible for 60 percent of heat or cooling loss in the average home. Convection is the transfer of air through gaps in the walls and roof of the home. Outside air leaking into the home or air infiltration, is responsible for 40 percent of heat or cooling loss in the average home.

Wood-framed homes rely on dimensional lumber, referred to as studs, at regular intervals to provide structural support. Lumber is a very poor insulator and forms a thermal bridge from the outside of the home to the inside of the home where heat can pass through by conduction. Door Framing, steel studs, and wood or metal window frames are also common thermal bridges.

Insulation around a thermal bridge is of little help in preventing heat loss or gain due to thermal bridging; the bridging has to be eliminated, rebuilt with a reduced cross-section or with materials that have better insulating properties, or with a section of material with low thermal conductivity installed between metal components to retard the passage of heat through a wall or window assembly, called a thermal break.

Figure 6A:
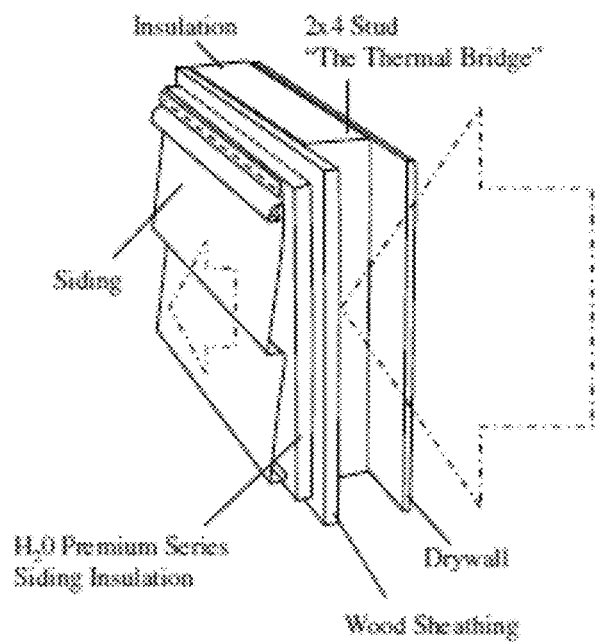
FIG. 6a illustrates the thermal bridge.
Figure 6B:
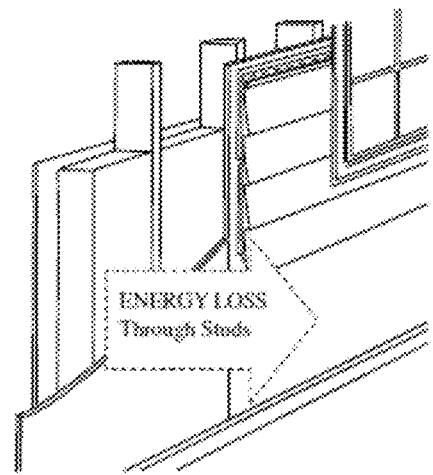
FIG. 6b illustrates the energy lost through studs.
Figure 7A:
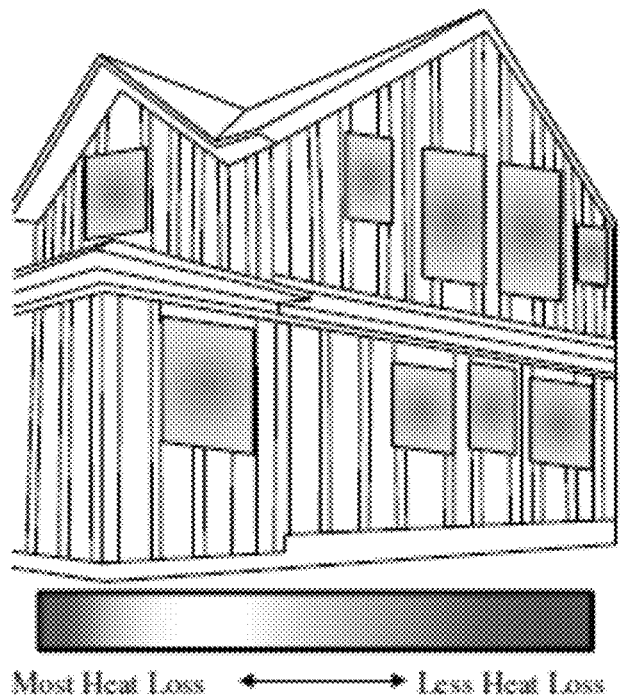
FIG. 7a illustrates the framing factor concept.
Figure 7B:
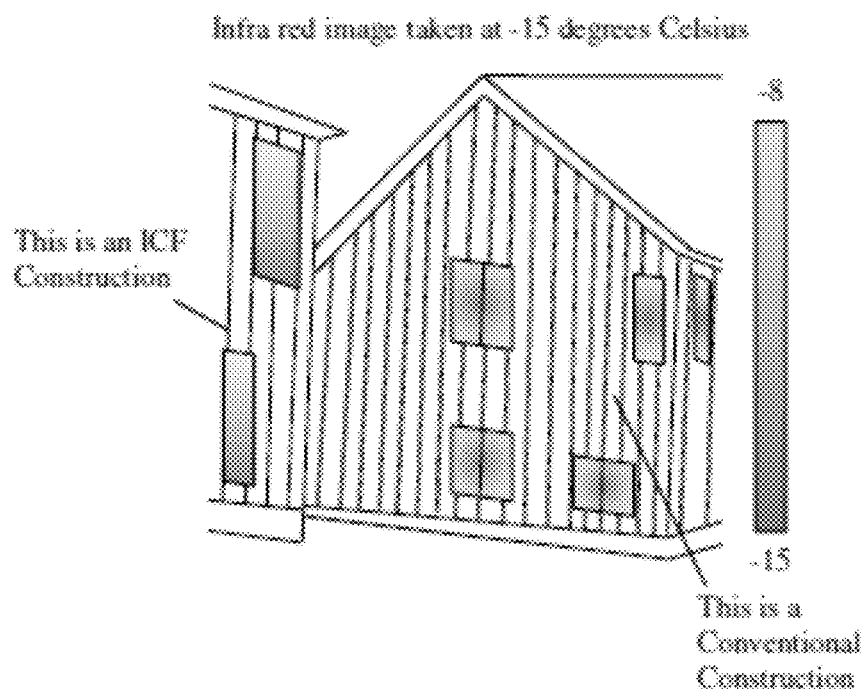
FIG. 7b illustrates the framing factor concept with an IR image.
Figure 8:
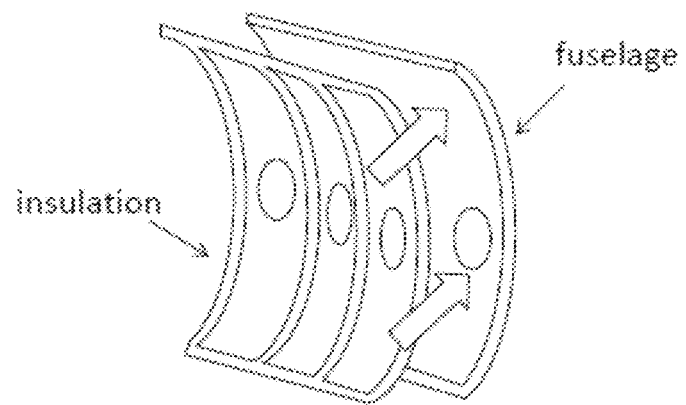
FIG. 8 illustrates an embodiment of the invention wherein the rigid polymer material sheet is used in an aviation acoustic thermal insulation system.
Figure 9:
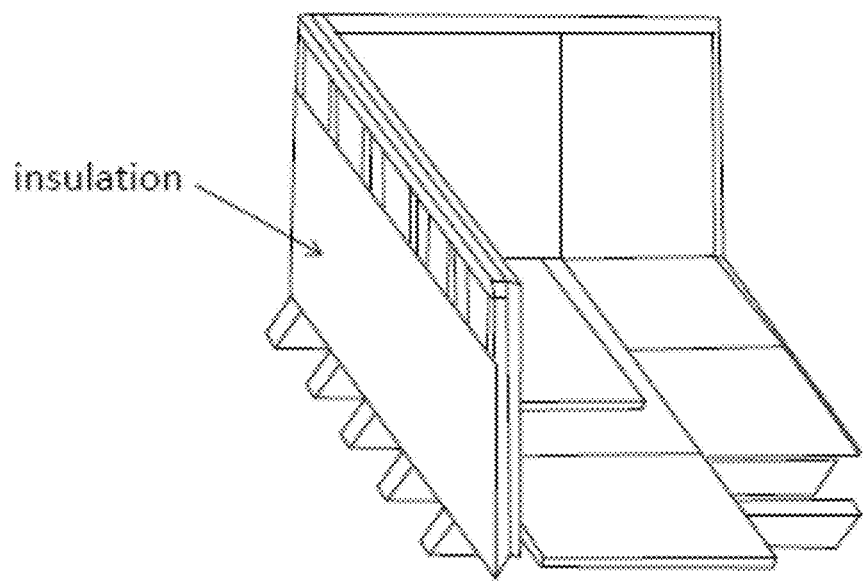
FIG. 9 illustrates a framed structure wherein a humidity expansion gap of ⅛" has been eliminated.

FIGS. 6a and 6b illustrate the thermal bridge and energy lost through studs. FIGS. 7a and 7b illustrate the framing factor concept.

Foaming Board Composite Wall Assembly Systems and Foaming Board related products comprising the subject inventive material create a thermal break in the thermal bridging occurring in wall assemblies of the building envelope resulting in a 114.33% increase in R-Value wall assembly system and building envelope. (See Wall Assembly R-Value Below).

Calculating Assembly Wall R-Value* (Standard 2×4 Wall Assembly)

*This example is just for wood frame construction. Steel studs are a more complex calculation Formula: Assembly R-Value=1/(Assembly U-Value)=1/(U-studs x %+U-cavity x %)

| component | Common Building Material | | | Subject invention | | |
|---|---|---|---|---|---|---|
| | R-Value Studs | R-Value Cavity | Assembly R-Value | R-Value Studs | R-Value Cavity | Assembly R-Value |
| Wall-Outside Air Film (Winter) | 0.17 | 0.17 | | 0.17 | 0.17 | |
| Siding-Wood Bevel | 0.80 | 0.80 | | 3.96 | 3.96 (1/2" .45 gm/cc + 1/2" .165 gm/cc) | |
| Plywood Sheathing (1/2) | 0.63 | 0.63 | | 3.93 | 3.93 (1" thick .165 gm/cc) | |
| 3 1/2" Fiberglass Batt | | 13.00 | | | 13.00 | |
| 3 1/2" Stud | 4.38 | | | 13.65 | (3.5" × 3.90 .165 gm/cc) | |
| 1/2" Drywall | 0.45 | 0.45 | | 3.96 | 3.96 (1" thick .165 gm/cc) | |
| Inside Air Film | 0.68 | 0.68 | | 0.68 | 0.68 | |
| Percent for 16" O.C. + Additional Studs^ | 25% | 75% | | 25% | 75% | |
| Total Wall Component R-Value | 7.11 | 15.73 | | 26.35 | 25.70 | |
| Wall Component U-Value | 0.1406 | 0.0636 | | 0.0379 | 0.0389 | |
| Total Wall Assembly R-Value | | | 12.07 | | | 25.87 |

(California Dept. Energy 25% framing factor)

| | Standard Wall R-Value | Subject Invention R-Value | Percent increase in Wall Assembly R-Value |
|---|---|---|---|
| California Energy Commission (25% Framing Factor) | 12.07 | 25.87 | 25.87 − 12.07 = 13.80 (13.80/12.07) × 100 = 114.33% |

*Foaming board wall assembly systems using the subject inventive material result in an increase in total wall assembly R-value from 12.07 to 25.87 which is an increase of 114.33%.

The foaming board composite wall assembly systems and foaming board related products of the subject invention eliminate or reduce to a measurable insignificant fraction thermal bridging and framing factor in the building envelope by applying its composite materials with superior industry leading R-Values to achieve a uniform thermal resistance throughout the entire wall assembly system.

The term "framing factor" is widely used to express a percent of the total wall area occupied by framing members. The extent to which a wall, roof, or floor's framing reduces the R-value of its insulation is called its "framing factor". It is simply a percentage reduction in R-value when thermal bridging occurs and a heal flow is created by conduction through the wood or steel frame of a building envelope. The more framing members in a wall structure, the higher the framing factor. Steel stud assemblies often have framing factors of 50% and above, while wood framing is usually closer to 25%. For example, a wall with R-20 insulation and a framing factor of 25% would have an overall insulation value of R-15.

According to a 2002 Report framing factors up to 27% can be found in residential walls in California in 2001. In 2003 a study by ASHRAE found an average of 25% framing factor for U.S. Homes. The result of these studies demonstrated significant sensitivity in some configurations of residential walls to the framing factor and insulation imperfections.

In keeping with the Energy modal Engineering report for the California Energy Commission, ALL wall assemblies in this report have framing factors of approximately 27% (1). It is well known that a presence of framing members (like wood or steel profiles) reduces the R-Value of a wall system. The measure of this effect is known as the framing factor coefficient 'F' of a wall, which is calculated using the following simple expression that contains clear-wall R-Value, Rcw, and the center-of-cavity R-Value, R n: $f=[1-Rcw/Rn]*100$.

The subject invention density 0.145 gm/cc is the only building board that can flex to an angle exceeding 130 degrees and then return to its original shape without any breaking, cracking or exterior flawing in its appearance or rigidity. (0.145 gm/cc density) Some concrete flexible cement board is available on the market. However, flexible cement board can only flex approximately 20 degrees and is not a thermal insulator. Foaming Board of the subject invention is the leading insulator with a multitude of applications and flexibility that is unmatched in the building material industry.

Eagle America Framing System—Common Wood and Engineered lumber are specifically prone to humidity induced water absorption resulting in Buckling, Crowning, and Cupping of panels and flooring when no space for humidity expansion is allotted for. Light-frame construction using "platform framing" and standardized dimensional lumber has become the dominant construction method in North America. Such light-frame structures usually gain strength from rigid panels (plywood and other plywood-like composites such as oriented strand board (OSB). However, due to humidity swelling properties of common and engineered wood, a "⅛" installation gap allowance for wood swelling" must be inserted between panels when installing subfloors, floors, walls, ceilings, and roofs in the framed structure.

The present invention was humidity conditioned under ASTM C 367 humidity test for 17 hours at 32° C. and 90% relative humidity, and then a 6 hour "wet" recovery period at 23° C. and 50% relative humidity at 145.28 kg/m3 density. Resulting in deflection of 0.033 of an inch at 90% humidity, and recovery of 0.037 of an inch when reduced to 50% relative humidity.

The present invention's minimal water absorption is in direct opposition to common and engineered wood building material attributes, and eliminates the need for the "⅛" installation gap allowance for wood swelling between panels when installing subfloors, floors, walls, ceilings, and roofs in a framed structure, and eliminates subsequent building defects associated with humidity swelling.

The elimination of the "⅛" gap creates an entirely new method of framing construction, and is known as "The Eagle America Framing System."

The "Eagle America Framing System" of present invention differentiates itself from common building materials, and standard "platform" framing construction by elimination of the ⅛" gap allowance for wood swelling. When assembled in accordance with present invention, said panels can be butted flush against each other increasing the overall structural stability. In addition, the system effectively seals the structure from moisture, air penetration and natural air drafts, eliminates pest pathways, increases the overall strength of the framed structure, and eliminates or reduces to a measurably insignificant fraction energy loss from thermal bridging due to (i) the elimination of the ⅛" gap, and (ii) the increased thermal insulation properties of present invention in sheet or lumber form verses common wood and wood related building materials.

Example #1

A rigid polymer material sheet for use building materials was prepared as follows:

| Component | Type/size | Parts by weight |
|---|---|---|
| PVC | BL-2 | 65 |
| Impact modifier | NBR3305 | 5 |
| Mesh wood fiber plant | 20 | 10 |
| Coupling agent | Titanate | 0.5 |
| Smoke suppressant | | 5 |
| Clay | 900 mesh | 3 |
| Lubricant | PE wax | 0.5 |
| Zinc oxide | Activator | 2 |
| Green flame retardant | Ammonium polyphosphate | 5 |
| Heat stabilizer | Calcium and zinc | 2 |
| tasteless crosslinking agent | BIPB | 0.5 |
| Foaming agent | AC-3000 | 1 |
| Deammoniation agent | HJ-1-- | 0.5 |

1) Plant fiber pretreated baking to reduce plant fiber moisture content to 2.5% and fed into a high-speed mixer. 2) Coupling agent added—mixture stirred for 10 minutes. 3) Knead mixture—add PVC, impact modifier, smoke suppressant, clay (attapulgite), lubricants, activator, flame retardant, heat stabilizer, desmopressin agent. 4) mixture is kneaded at 65N of pressure for 10 min. with sweep 2 times; temperature within a range of 140-142° C.; 5) cross-linking and blowing agents added. Mixture kneaded ~3 min; 6) open mill soak, mill thick run, thin through at 125° C. Mixture fed into a vulcanizing mold foaming machine, curing temperature control ~170° C., foaming time is ~45 min; 7) material is compacted and cooled. Formed into sheets for building materials—R-values measured:

| | Subject Invention Foaming Board | | |
|---|---|---|---|
| | Thickness | .145 gm/cc R-Value | .165 gm/cc R-Value |
| Material: building material | | | |
| Plywood | ¾" | 3.02 | 2.91 |
| Plywood | 1" | 3.99 | 3.88 |
| Particle Board (underlayment) | 1" | 3.98 | 3.92 |
| Hardwood Flooring | ¾" | 3.06 | 2.95 |
| Hardwood Flooring | 1" | 3.99 | 3.92 |
| Tile, Linoleum | | 2.01 | 1.94 |
| OSB Insulated Subfloor Panel System | 2" | 8.03 | 7.82 |
| Material: Doors | | | |
| Wood Hollow Core Flush | 1¾" | 7.01 | 6.86 |
| Wood Solid core Flush | 1¾" | 7.02 | 6.87 |
| Wood Solid core Flush | 2¼" | 9.04 | 8.81 |
| Insulated metal door (2" w/urethane) | 2" | 8.03 | 7.83 |

Example #2

A rigid polymer material sheet for use building materials was prepared as follows:

| Component | Type/size | Parts by weight |
|---|---|---|
| PVC | BL-3 | 55 |
| Plasticizers | Chlorinated paraffins | 6 |
| Nitrate Rubber | NBR3305 | 12 |
| Pyridinium Chlorochromate (PCC) | 900 eye | 4 |
| Stearate | SA1840 | 1 |
| Zinc Oxide | BA01-05I | 3 |
| Flame Retardants | CA117 | 10 |
| Crosslinking Agents | DCP | 1 |
| Vesicant | ADC complex foaming agent | 3 |
| Heat stabilizers | STM981A | 5 |

(1) kneading: PVC, rubber (NBR), plasticizer, 5 light calcium carbonate, stearate, zinc oxide, flame retardant, heat stabilizer; pressurized to 75 liters 7-8 KG kneading 10; 140-145° C. discharge, obtain compound; (2) Thermal refining: Step (1) mixing the resulting compound into 20-inch mill refining heat hit triangle bag; three times thinner package, and then put into 20-inch mill heat refining play triangle bag, then resort to the secondary thick packet, mixing machine temperature control 145-150° C.; (3) a film: the after step (2) soak and then put into the plastic material 20-inch mill, a refining machine temperature control 145-150° C., film thickness of 2-3 mm the film, the film is cut into strips, cooling cooled to obtain a green sheet of plastic; (4) vulcanizing mold: will be closed-cell foam vulcanization, sulfur within the step (3) the resulting sheet into the embryo glue curing machine dies 1300 tons of pressure, curing time of 35 minutes, curing temperature 160±5° C., obtain foam to be stable foam form, cooled to obtain a building material. Formed into sheets for building materials—R-values measured:

| | Subject Invention Foaming Board | | |
|---|---|---|---|
| | Thickness | .145 gm/cc R-Value | .165 gm/cc R-Value |
| Material: building material | | | |
| Plywood | ¾" | 3.00 | 2.92 |
| Plywood | 1" | 4.01 | 3.89 |
| Particle Board (underlayment) | 1" | 3.99 | 3.91 |
| Hardwood Flooring | ¾" | 3.07 | 2.96 |
| Hardwood Flooring | 1" | 3.99 | 3.90 |
| Tile, Linoleum | | 2.00 | 1.93 |
| OSB Insulated Subfloor Panel System | 2" | 8.02 | 7.8 |
| Material: Doors | | | |
| Wood Hollow Core Flush | 1¾" | 7.00 | 6.87 |
| Wood Solid core Flush | 1¾" | 7.03 | 6.87 |
| Wood Solid core Flush | 2¼" | 9.05 | 8.83 |
| Insulated metal door (2" w/urethane) | 2" | 8.04 | 7.82 |

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A rigid polymer material sheet for use in building construction, the rigid polymer material sheet composed of: a polymer mixture of ultrafine particles of polyvinylchloride (PVC), impact modifier, plant fiber, coupling agent, smoke suppressant, activated clay, lubricant, an activator, environmentally friendly flame retardant, heat stabilizers, odorless crosslinking agent, foaming agent; whereby said rigid polymer material sheet provides enhanced thermal resistance and sound attenuation properties for use in building construction, aviation and marine industries.

2. The rigid polymer material sheet as recited by claim 1, wherein said rigid polymer material sheet has the following weight percent ranges: PVC: 55-85, impact modifier: 4-15, plant fiber: 10-40, coupling agent: 0.5-5, smoke suppressant: 5-25, activated clay: 2-25, lubricant: 0.3-5, the activator: 2-10, environmentally friendly flame retardant: 5-15, heat stabilizers: 2-12, odorless crosslinking agent: 0.2-2.5, the foaming agent: 0.5-7.

3. The rigid polymer material sheet as recited as recited by claim 1, said sheet being suitable for use for at least one member of a group consisting of: a wall board, wall, floor and ceiling assembly systems, and sheathing board, due to its increased thermal insulation properties and bend properties.

4. The rigid polymer material sheet as recited as recited by claim 1, said sheet being suitable for use for at least one member of a group consisting of: lumber and framing structures and in wall, floor and ceiling assembly systems due to its increased thermal insulation properties and bend properties.

5. The rigid polymer material sheet as recited by claim 1, said sheet being suitable for use as a flooring material due to its increased thermal insulation properties.

6. The rigid polymer material sheet as recited by claim 1, said sheet being suitable for use as siding or embossed interior/exterior insulation sheets due to its increased thermal insulation properties.

7. The rigid polymer material sheet as recited by claim 1, said sheet being suitable for use as a building board due to its increased strength, bend capability and thermal insulation properties.

8. The rigid polymer material sheet as recited by claim 1, said sheet being suitable for use for at least one member of a group consisting of: door and window and door framing due to its increased strength, bend capability, paintability and thermal insulation properties.

9. The rigid polymer material sheet as recited by claim 1, wherein said sheet is used in aeronautic acoustic thermal insulation systems.

\* \* \* \* \*